(12) United States Patent
Noguchi et al.

(10) Patent No.: US 8,614,273 B2
(45) Date of Patent: Dec. 24, 2013

(54) SEAL MEMBER

(75) Inventors: Toru Noguchi, Kamizawa-machi (JP);
Hiroyuki Ueki, Ueda (JP); Shigeki Inukai, Ueda (JP); Masaei Ito, Sagamihara (JP); Raghu Madhavan, Rosharon, TX (US); Morinobu Endo, Suzaka (JP); Satoshi Iinou, Nagano (JP)

(73) Assignees: Nissin Kogyo Co., Ltd., Ueda (JP);
Schlumberger Technology Corporation, Sugar Land, TX (US);
Shinshu University, Matsumoto (JP)

( * ) Notice: Subject to any disclaimer, the term of this patent is extended or adjusted under 35 U.S.C. 154(b) by 143 days.

(21) Appl. No.: 12/647,898

(22) Filed: Dec. 28, 2009

(65) Prior Publication Data

US 2011/0156355 A1 Jun. 30, 2011

(51) Int. Cl.
*C08K 3/04* (2006.01)

(52) U.S. Cl.
USPC ........................................................ 524/495

(58) Field of Classification Search
USPC ........................................................ 524/495
See application file for complete search history.

(56) References Cited

U.S. PATENT DOCUMENTS

| | | | |
|---|---|---|---|
| 3,653,436 A | 4/1972 | Anderson et al. | |
| 4,714,119 A | 12/1987 | Herbert et al. | |
| 4,782,695 A | 11/1988 | Glotin et al. | |
| 4,860,581 A | 8/1989 | Zimmerman et al. | |
| 6,058,773 A | 5/2000 | Zimmerman et al. | |
| 6,179,055 B1 | 1/2001 | Sallwasser et al. | |
| 6,467,544 B1 | 10/2002 | Brown et al. | |
| 6,604,922 B1 | 8/2003 | Hache | |
| 6,758,090 B2 | 7/2004 | Bostrom et al. | |
| 7,083,008 B2 | 8/2006 | Thorp et al. | |
| 7,188,685 B2 | 3/2007 | Downton et al. | |
| 7,191,831 B2 | 3/2007 | Reid et al. | |
| 7,392,851 B2 | 7/2008 | Brennan, III et al. | |
| 7,438,970 B2 | 10/2008 | Magario et al. | |
| 7,461,547 B2 | 12/2008 | Terabayashi et al. | |
| 7,501,459 B2 | 3/2009 | Noguchi et al. | |
| 7,578,342 B2 | 8/2009 | Brennan, III et al. | |
| 7,619,029 B1 | 11/2009 | Noguchi et al. | |
| 2003/0138332 A1* | 7/2003 | Osako et al. | 417/269 |
| 2004/0241440 A1 | 12/2004 | Noguchi et al. | |
| 2005/0075443 A1 | 4/2005 | Noguchi et al. | |
| 2006/0157283 A1 | 7/2006 | Hart | |
| 2006/0214560 A1 | 9/2006 | Noguchi et al. | |
| 2006/0216178 A1 | 9/2006 | Sindt et al. | |
| 2007/0100058 A1 | 5/2007 | Noguchi et al. | |
| 2007/0112124 A1 | 5/2007 | Noguchi et al. | |
| 2008/0132635 A1 | 6/2008 | Noguchi et al. | |
| 2008/0167417 A1 | 7/2008 | Noguchi et al. | |
| 2009/0000880 A1 | 1/2009 | Noguchi et al. | |
| 2009/0078412 A1 | 3/2009 | Kanayama et al. | |
| 2009/0133932 A1 | 5/2009 | Church | |
| 2009/0166918 A1* | 7/2009 | Noguchi et al. | 264/211.23 |
| 2009/0253852 A1* | 10/2009 | Noguchi et al. | 524/496 |
| 2010/0009160 A1 | 1/2010 | Noguchi et al. | |
| 2010/0009183 A1 | 1/2010 | Noguchi et al. | |
| 2010/0009204 A1 | 1/2010 | Noguchi et al. | |

FOREIGN PATENT DOCUMENTS

| | | |
|---|---|---|
| JP | A-63-280788 | 11/1988 |
| JP | A-2000-302917 | 10/2000 |
| JP | A-2005-97525 | 4/2005 |
| JP | A-2007-63429 | 3/2007 |
| JP | A-2008-143963 | 6/2008 |
| JP | A-2008-308515 | 12/2008 |
| JP | A-2009-275337 | 11/2009 |
| WO | WO 2009/128374 A1 | 10/2009 |

OTHER PUBLICATIONS

U.S. Appl. No. 11/475,032, filed Jun. 27, 2006 in the name of Noguchi et al.
U.S. Appl. No. 12/647,943, filed Dec. 28, 2009 in the name of Noguchi et al.
U.S. Appl. No. 12/648,040, filed Dec. 28, 2009 in the name of Noguchi et al.
U.S. Appl. No. 12/647,948, filed Dec. 28, 2009 in the name of Noguchi et al.
International Search Report issued in Japanese Patent Application No. PCT/JP2009/071905 on Mar. 30, 2010 (with translation).

* cited by examiner

*Primary Examiner* — Yong Chu
*Assistant Examiner* — Sonya Wright
(74) *Attorney, Agent, or Firm* — Oliff & Berridge, PLC

(57) ABSTRACT

A seal member includes a hydrogenated acrylonitrile-butadiene rubber (HNBR) and carbon nanofibers. The seal member has a number of cycles to fracture of 7000 or more when subjected to a tensile fatigue test at a temperature of 70° C., a maximum tensile stress of 4 N/mm, and a frequency of 1 Hz. The seal member exhibits excellent abrasion resistance.

20 Claims, 8 Drawing Sheets

SEAL MEMBER

BACKGROUND OF THE INVENTION

The present invention relates to a seal member.

The inventors of the invention proposed a method of producing a carbon nanofiber composite material that improves the dispersibility of carbon nanofibers using an elastomer so that the carbon nanofibers can be uniformly dispersed in the elastomer (see JP-A-2005-97525, for example). According to this method of producing a carbon nanofiber composite material, the elastomer and the carbon nanofibers are mixed, and the dispersibility of the carbon nanofibers that have strong aggregating properties is improved by applying a shear force. Specifically, when mixing the elastomer and the carbon nanofibers, the viscous elastomer enters the space between the carbon nanofibers while specific portions of the elastomer are bonded to highly active sites of the carbon nanofibers through chemical interaction. When a high shear force is applied to the mixture of the carbon nanofibers and the elastomer having an appropriately long molecular length and a high molecular mobility (exhibiting elasticity), the carbon nanofibers move along with the deformation of the elastomer. The aggregated carbon nanofibers are separated by the restoring force of the elastomer due to elasticity, and become dispersed in the elastomer. Expensive carbon nanofibers can be efficiently used as a filler for a composite material by thus improving the dispersibility of the carbon nanofibers in the matrix.

SUMMARY

According to one aspect of the invention, there is provided a seal member comprising a hydrogenated acrylonitrile-butadiene rubber (HNBR) and carbon nanofibers, the seal member having a number of cycles to fracture of 7000 or more when subjected to a tension fatigue test at a temperature of 70° C., a maximum tensile stress of 4 N/mm, and a frequency of 1 Hz.

DETAILED DESCRIPTION OF THE EMBODIMENT

Figure 1:
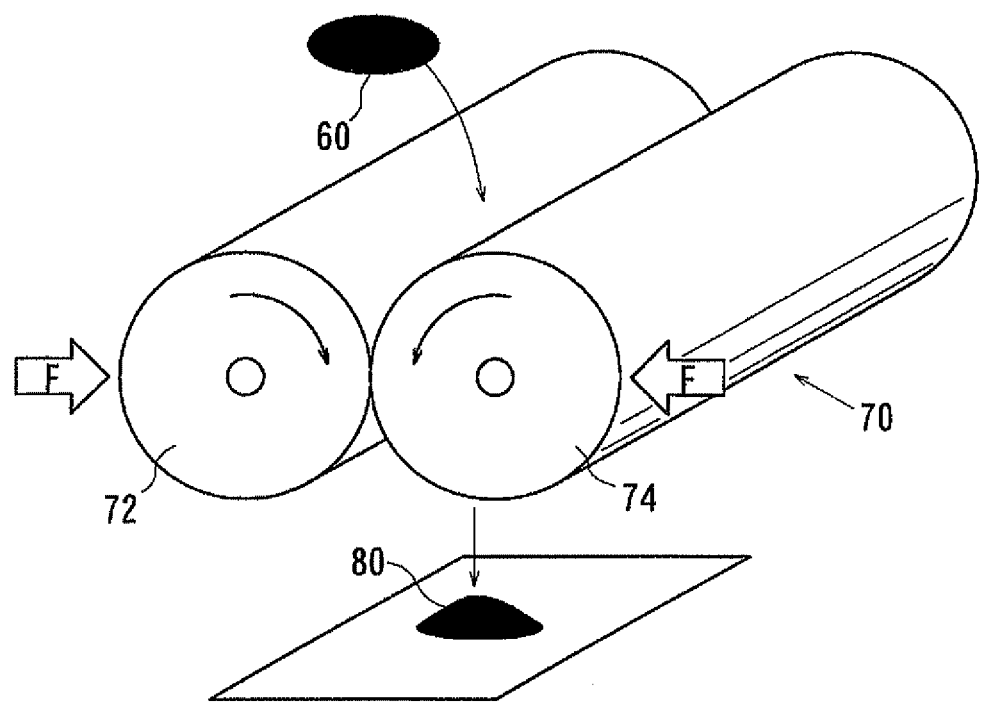
FIG. 1 is a perspective view schematically illustrating a process of compressing carbon nanofibers used for a seal member according to one embodiment of the invention.

The invention may provide a seal member that exhibits excellent abrasion resistance.

According to one embodiment of the invention, there is provided a seal member comprising a hydrogenated acrylonitrile-butadiene rubber (HNBR) and carbon nanofibers, the seal member having a number of cycles to fracture of 7000 or more when subjected to a tension fatigue test at a temperature of 70° C., a maximum tensile stress of 4 N/mm, and a frequency of 1 Hz.

The seal member may include 10 to 60 parts by mass of the carbon nanofibers and 0 to 100 parts by mass of a filler having an average particle diameter of 5 to 100 nm based on 100 parts by mass of the hydrogenated acrylonitrile-butadiene rubber (HNBR), the carbon nanofibers having an average diameter of 10 to 20 nm, and the amount of the carbon nanofibers and the amount of the filler satisfying the following expressions (1) and (2), $$Wt = 0.1 W1 + W2 \quad (1)$$

$$20 \leq Wt \leq 60 \quad (2)$$

W1: amount (parts by mass) of filler, and
W2: amount (parts by mass) of carbon nanofibers.

The seal member may include 14 to 100 parts by mass of the carbon nanofibers and 0 to 60 parts by mass of a filler having an average particle diameter of 5 to 100 nm based on 100 parts by mass of the hydrogenated acrylonitrile-butadiene rubber (HNBR), the carbon nanofibers having an average diameter of 60 to 110 nm, and the amount of the carbon nanofibers and the amount of the filler satisfying the following expressions (3) and (4), $$Wt = 0.1 W1 + W2 \quad (3)$$

$$20 \leq Wt \leq 100 \quad (4)$$

W1: amount (parts by mass) of filler, and
W2: amount (parts by mass) of carbon nanofibers.

The seal member may have a number of cycles to fracture of 10,000 or more when subjected to a tensile fatigue test at a temperature of 70° C., a maximum tensile stress of 4 N/mm, and a frequency of 1 Hz.

The seal member may have an abrasion loss Wa of 0.010 to 0.035 cm$^3$/N·m when subjected to a high-pressure abrasion test at 25° C., the abrasion loss Wa satisfying the following expression (5), $$Wa = (g_2 - g_1)/(P \cdot L \cdot d) \quad (5)$$

$g_1$: mass (g) of specimen before abrasion test,
$g_2$: mass (g) of specimen after abrasion test,
P: load (N) of weight,
L: abrasion distance (m), and
d: specific gravity (g/cm$^3$).

In the seal member, the carbon nanofibers may be carbon nanofibers subjected to an oxidation treatment.

In the seal member, the carbon nanofibers may be carbon nanofibers subjected to a low-temperature heat treatment, and the amount of the carbon nanofibers may be 54 to 100 parts by mass.

The seal member may be used for an oilfield apparatus.

In this case, the oilfield apparatus may be a logging tool that performs a logging operation in a borehole.

The seal member may be an endless seal member that is disposed in the oilfield apparatus.

The seal member may be a stator of a fluid-driven motor that is disposed in the oilfield apparatus.

In this case, the fluid-driven motor may be a mud motor.

The seal member may be a rotor of a fluid-driven motor that is disposed in the oilfield apparatus.

In this case, the fluid-driven motor may be a mud motor.

In the seal member, the hydrogenated acrylonitrile-butadiene rubber (HNBR) may have an acrylonitrile content of 30 to 50 mass %, a Mooney viscosity ($ML_{1+4}100°$ C.) center value of 50 to 100, and a hydrogenation rate of 90% or more.

In the seal member, the carbon nanofibers may have an average rigidity of 3 to 12 before the carbon nanofibers are mixed into the hydrogenated acrylonitrile-butadiene rubber (HNBR), the rigidity being defined by Lx÷D (Lx: distance between adjacent defects of carbon nanofiber, D: diameter of carbon nanofiber).

In the seal member, the filler may be carbon black having an average particle diameter of 10 to 100 nm.

In the seal member, the filler may be at least one material selected from silica, talc, and clay, and may have an average particle diameter of 5 to 50 nm.

The seal member may have a ratio (Nb/Na) of a number of cycles to fracture Nb when subjected to a tension fatigue test at a temperature of 150° C., a maximum tensile stress of 2.5 N/mm, and a frequency of 1 Hz to a number of cycles to fracture Na when subjected to a tension fatigue test at a temperature of 150° C., a maximum tensile stress of 2 N/mm, and a frequency of 1 Hz, of 0.7 or more.

1. Carbon Nanofibers

The carbon nanofibers are described below.

The carbon nanofibers used in this embodiment may have an average diameter (fiber diameter) of 10 to 110 nm, and preferably 10 to 20 nm or 60 to 110 nm. Since the carbon nanofibers have a relatively small average diameter, the carbon nanofibers have a large specific surface area. Therefore, the surface reactivity of the carbon nanofibers with the HNBR (matrix) is improved so that the dispersibility of the carbon nanofibers in the HNBR can be improved. If the diameter of the carbon nanofibers is 10 nm or more, a minute cell structure formed by the carbon nanofibers to enclose the matrix material has a moderate size to achieve moderate flexibility. If the diameter of the carbon nanofibers is 110 nm or less, the minute cell structure also has a moderate size to achieve abrasion resistance. The minute cell structure may be formed by the carbon nanofibers so that a three-dimensional network structure of the carbon nanofibers encloses the matrix material. The average diameter of the carbon nanofibers having an average diameter of 60 to 110 nm is preferably 70 to 100 nm. The carbon nanofibers having an average diameter of 60 to 110 nm may be subjected to an oxidation treatment or a low-temperature heat treatment in order to improve the surface reactivity of the carbon nanofibers with the HNBR. The oxidation treatment and the low-temperature heat treatment are described later.

The average diameter of the carbon nanofibers may be measured using an electron microscope. The average diameter and the average length of the carbon nanofibers may be determined by measuring the diameter and the length of the carbon nanofibers in 200 areas or more from an image photographed using an electron microscope at a magnification of 5000 (the magnification may be appropriately changed depending on the size of the carbon nanofibers), and calculating the arithmetic mean values of the diameter and the length of the carbon nanofibers.

The carbon nanofibers may be used in an amount of 20 to 100 parts by mass based on 100 parts by mass of the HNBR. When using the carbon nanofibers having an average diameter of 10 to 20 nm, the carbon nanofibers may be used in an amount of 20 to 60 parts by mass based on 100 parts by mass of the HNBR. When using the carbon nanofibers having an average diameter of 60 to 110 nm, the carbon nanofibers may be used in an amount of 20 to 100 parts by mass based on 100 parts by mass of the HNBR. It is considered that the carbon nanofibers form a nanometer-sized cell structure to improve abrasion resistance when the carbon nanofibers are used in an amount of 20 parts by mass or more based on 100 parts by mass of the HNBR. When the carbon nanofibers are used in an amount of 60 parts by mass or less based on 100 parts by mass of the HNBR, a relatively high elongation at break (EB) is achieved so that excellent processability is achieved. Moreover, the seal member can be easily mounted on parts. The amount of carbon nanofibers used may be reduced by adding a filler other than the carbon nanofibers. When adding a filler other than the carbon nanofibers, the carbon nanofibers having an average diameter of 10 to 20 nm may be used in an amount of 10 to 60 parts by mass based on 100 parts by mass of the HNBR, and the carbon nanofibers having an average diameter of 60 to 110 nm may be used in an amount of 14 to 100 parts by mass based on 100 parts by mass of the HNBR. The unit "parts by mass" indicates "phr" unless otherwise stated. The unit "phr" is the abbreviation for "parts per hundred of resin or rubber", and indicates the percentage of an additive or the like with respect to the rubber or the like.

The carbon nanofibers may be relatively rigid fibers having an average rigidity of 3 to 12 before the carbon nanofibers are mixed into the hydrogenated acrylonitrile-butadiene rubber (HNBR). The carbon nanofibers having an average diameter of 10 to 20 nm may have an average rigidity of 3 to 5, and the carbon nanofibers having an average diameter of 60 to 110 nm may have an average rigidity of 9 to 12. The term "rigidity" is also referred to as a bending index. The rigidity of the carbon nanofibers is determined by measuring the lengths and the diameters of almost linear portions of the carbon nanofibers photographed using a microscope or the like, and calculating the rigidity from the measured values. A bent portion (defect) of a carbon nanofiber photographed using an electron microscope appears as a white line that crosses the carbon nanofiber in the widthwise direction. When the length of an almost linear portion of the carbon nanofiber is referred to as Lx, and the diameter of the carbon nanofiber is referred to as D, the rigidity of the carbon nanofiber is defined by Lx÷D, and the arithmetic mean value thereof is calculated. Therefore, a carbon nanofiber having a low rigidity is bent at a short interval, and a carbon nanofiber having a high rigidity has a long linear portion and is not bent. The length Lx of the linear portion of the carbon nanofiber is measured in a state in which photographic data of the carbon nanofibers photographed at a magnification of 10,000 to 50,000 is enlarged by a factor of 2 to 10, for example. A bent portion (defect) that crosses the carbon nanofiber in the widthwise direction can be observed in the enlarged photograph. The distance between the adjacent bent portions (defects) thus observed is measured at a plurality of (e.g., 200 or more) points as the length Lx of the linear portion of the carbon nanofiber.

The carbon nanofibers are multi-walled carbon nanotubes (MWNT) having a shape obtained by rolling up a graphene sheet in the shape of a tube. Examples of the carbon nanofibers having an average diameter of 10 to 20 nm include VGCF-X (manufactured by Showa Denko K.K.) ("VGCF" is a registered trademark of Showa Denko K.K.), Baytubes (manufactured by Bayer MaterialScience), NC-7000 (manufactured by Nanocyl), and the like. Examples of the carbon nanofibers having an average diameter of 60 to 110 nm include VGCF-S (manufactured by Showa Denko K.K.) and the like. A carbon material having a partial carbon nanotube structure may also be used. The carbon nanotube may also be referred to as a graphite fibril nanotube or a vapor-grown carbon fiber.

The carbon nanofibers may be produced by a vapor growth method. The vapor growth method is also referred to as catalytic chemical vapor deposition (CCVD). The vapor growth method pyrolyzes a gas (e.g., hydrocarbon) in the presence of a metal catalyst to produce untreated first carbon nanofibers. As the vapor growth method, a floating reaction method that introduces an organic compound (e.g., benzene or toluene) (i.e., raw material) and an organotransition metal compound (e.g., ferrocene or nickelocene) (i.e., metal catalyst) into a reaction furnace set at a high temperature (e.g., 400 to 1000° C.) together with a carrier gas to produce first carbon nanofibers that are in a floating state or deposited on the wall of the reaction furnace, a substrate reaction method that causes metal-containing particles supported on a ceramic (e.g., alumina or magnesium oxide) to come in contact with a carbon-containing compound at a high temperature to produce carbon nanofibers on a substrate, or the like may be used. The carbon nanofibers having an average diameter of 10 to 20 nm may be produced by the substrate reaction method, and the carbon nanofibers having an average diameter of 60 to 110 nm may be produced by the floating reaction method. The diameter of the carbon nanofibers may be adjusted by changing the size of the metal-containing particles, the reaction time, and the like. The carbon nanofibers having an average diameter of 10 to 20 nm may have a specific surface area by nitrogen adsorption of 10 to 500 $m^2/g$, preferably 100 to 350 $m^2/g$, and particularly preferably 150 to 300 $m^2/g$.

The carbon nanofibers having an average diameter of 60 to 110 nm and subjected to a low-temperature heat treatment may be produced by subjecting untreated carbon nanofibers produced by the vapor growth method to a low-temperature heat treatment. The low-temperature heat treatment may include heating the untreated carbon nanofibers at a temperature that is within the range of 1100 to 1600° C. and is higher than the reaction temperature employed in the vapor growth method. The heating temperature may be 1200 to 1500° C., and preferably 1400 to 1500° C. If the low-temperature heat treatment temperature is higher than the reaction temperature employed in the vapor growth method, the surface structure of the carbon nanofibers can be adjusted so that surface defects can be reduced. If the low-temperature heat treatment temperature is 1100 to 1600° C., the carbon nanofibers exhibit improved surface reactivity with the HNBR so that the dispersibility of the carbon nanofibers in the matrix material can be improved. The carbon nanofibers subjected to the low-temperature heat treatment may have a ratio (D/G) of a peak intensity D at around 1300 $cm^{-1}$ to a peak intensity G at around 1600 $cm^{-1}$ measured by Raman scattering spectroscopy of more than 0.9 and less than 1.6, and preferably 1.0 to 1.4. When the low-temperature heat treatment temperature is 1400 to 1500° C., the carbon nanofibers may have a ratio (D/G) of 1.0 to 1.2. In the Raman spectrum of the carbon nanofibers subjected to the low-temperature heat treatment, the peak intensity D at around 1300 $cm^{-1}$ is attributed to defects in the crystal that forms the carbon nanofibers, and the peak intensity G at around 1600 $cm^{-1}$ is attributed to the crystal that forms the carbon nanofibers. Therefore, the smaller the ratio (D/G) of the peak intensity D to the peak intensity G the higher the degree of crystallization of the carbon nanofibers. Accordingly, the smaller the ratio (D/G) of the peak intensity D to the peak intensity G, the higher the degree of graphitization of the carbon nanofibers (i.e., the number of surface defects is small). Therefore, the carbon nanofibers subjected to the low-temperature heat treatment and having the ratio (D/G) of the peak intensity D to the peak intensity G within the above range appropriately have non-crystalline portions on the surface to exhibit excellent wettability with the HNBR. Moreover, since the number of surface defects is relatively small, the carbon nanofibers subjected to the low-temperature heat treatment exhibit sufficient strength.

The carbon nanofibers produced by the vapor growth method are normally heated (graphitized (crystallized)) at 2000 to 3200° C. in an inert gas atmosphere to remove impurities (e.g., amorphous products deposited on the surface of the carbon nanofibers during vapor growth and residual metal catalyst). Since the graphitized carbon nanofibers have relatively low surface reactivity with the HNBR, the graphitized carbon nanofibers may be subjected to an oxidation treatment, for example. The carbon nanofibers having an average diameter of 60 to 110 nm and subjected to an oxidation treatment may be obtained by subjecting to the carbon nanofibers to the oxidation treatment after the graphitization treatment. The graphitization treatment temperature is preferably 2500 to 3200° C., and particularly preferably 2800 to 3200° C. If the graphitization treatment temperature is 2500° C. or more, the skeleton of the carbon nanofibers is graphitized (crystallized) so that defects of the carbon nanofibers are reduced (i.e., the strength of the carbon nanofibers is improved). If the graphitization treatment temperature is 3200° C. or less, destruction of the graphite skeleton due to sublimation rarely occurs. The carbon nanofibers may exhibit excellent strength, thermal conductivity, electrical conductivity, and the like as a result of graphitization. The carbon nanofibers having an average diameter of 10 to 20 nm or 60 to 110 nm and subjected to the low-temperature heat treatment may be used without subjecting the carbon nanofibers to the graphitization treatment. Since non-crystalline portions are moderately present on the surface of the carbon nanofibers that are not subjected to the graphitization treatment, the carbon nanofibers tend to exhibit excellent wettability with the HNBR.

The carbon nanofibers having an average diameter of 60 to 110 nm and subjected to the oxidation treatment may be produced by heating the carbon nanofibers subjected to the graphitization treatment at 600 to 800° C. in an atmosphere that contains oxygen.

For example, the carbon nanofibers subjected to the graphitization treatment are placed in a furnace containing air, and heated at a given temperature within the range of 600 to 800° C. to obtain carbon nanofibers of which the surface has been oxidized to a desired oxygen concentration. The heat treatment time (i.e., the period of time in which the carbon nanofibers are held in the heat treatment furnace at a given temperature) may be 10 to 180 minutes, for example. The atmosphere that contains oxygen may be an ambient atmosphere, an oxygen atmosphere, or an atmosphere of which the oxygen concentration is appropriately set. The amount of oxygen introduced into the heat treatment furnace may be appropriately adjusted depending on the internal volume of the heat treatment furnace and the amount of carbon nanofibers subjected to the oxidation treatment. It suffices that the atmosphere have an oxygen concentration sufficient for the surface of the carbon nanofibers to be oxidized to a desired oxygen concentration by the oxidation treatment. The heat treatment temperature may be appropriately set within the range of 600 to 800° C. so that the desired oxidation treatment is achieved. The carbon nanofibers are normally burnt and damaged to a large extent at about 800° C. Therefore, it is desirable to carefully set the heat treatment temperature and the heat treatment time through repeated experiments. Note that the heat treatment temperature and the heat treatment time may be appropriately adjusted depending on the oxygen concentration in the furnace, the internal volume of the furnace, the amount of carbon nanofibers subjected to the oxidation treatment, and the like. The term "heat treatment temperature" used in this embodiment refers to the temperature of the atmosphere inside the heat treatment furnace.

The oxidation treatment is performed so that the amount of increase in the oxygen concentration of the surface of the carbon nanofibers subjected to the oxidation treatment as determined by X-ray photoelectron spectroscopy (XPS) with respect to the oxygen concentration of the surface of the carbon nanofibers before being subjected to the oxidation treatment as determined by X-ray photoelectron spectroscopy (XPS), is 0.5 to 2.6 atm %. The oxidation treatment may be performed so that the oxygen concentration of the surface of the carbon nanofibers subjected to the oxidation treatment as determined by X-ray photoelectron spectroscopy (XPS) is higher than the oxygen concentration of the surface of the carbon nanofibers before being subjected to the oxidation treatment as determined by X-ray photoelectron spectroscopy (XPS), by a factor of 20 to 120%. The oxygen concentration of the surface of the carbon nanofibers subjected to the oxidation treatment as determined by X-ray photoelectron spectroscopy (XPS) may be 2.6 to 4.6 atm %, preferably 3.0 to 4.0 atm %, and particularly preferably 3.1 to 3.7 atm %. If the surface of the carbon nanofibers before being subjected to the oxidation treatment is moderately oxidized, the surface reactivity of the carbon nanofibers subjected to the oxidation treatment with the elastomer is improved, so that the dispersibility of the carbon nanofibers in the elastomer is improved.

The mass of the carbon nanofibers subjected to the oxidation treatment may be reduced as compared with the mass of the carbon nanofibers before being subjected to the oxidation treatment by a factor of 2 to 20%, for example. If the mass reduction rate is within this range, it is considered that the carbon nanofibers are moderately oxidized (i.e., exhibit improved wettability with the HNBR). It is considered that the length of the carbon nanofibers is reduced to only a small extent if the mass of the carbon nanofibers subjected to the oxidation treatment is not reduced as compared with the mass of the carbon nanofibers before being subjected to the oxidation treatment by a factor of more than 20%. The oxygen concentration of the surface of the carbon nanofibers may be analyzed by X-ray photoelectron spectroscopy (XPS). The oxygen concentration of the surface of the carbon nanofibers is preferably analyzed by XPS after subjecting the carbon nanofibers to an argon gas etching treatment for 0.5 to 1.0 minutes to remove impurities that adhere to the surface of the carbon nanofibers to expose the surface of the carbon nanofibers, for example. The argon gas concentration employed in the argon gas etching treatment may be $5 \times 10^{-2}$ to $20 \times 10^{-2}$ Pa. When analyzing the oxygen concentration of the surface of the carbon nanofibers by XPS, a carbon tape (i.e., conductive adhesive) may be bonded to a metal stage of an XPS apparatus, the carbon nanofibers may be sprinkled over and caused to adhere to the carbon tape, the carbon nanofibers that do not adhere to the carbon tape may be removed, and the oxygen concentration may then be analyzed, for example. Specifically, the oxygen concentration of the surface of the carbon nanofibers may be analyzed by XPS while allowing the carbon nanofibers to be in a powder-like state without pressing the carbon nanofibers on the carbon tape to have a block-like form.

The carbon nanofibers subjected to the oxidation treatment may have a ratio (D/G) of the peak intensity D at around 1300 cm$^{-1}$ to the peak intensity G at around 1600 cm$^{-1}$ measured by Raman scattering spectroscopy of 0.12 to 0.22. The carbon nanofibers subjected to the oxidation treatment have a Raman peak ratio (D/G) larger than that of the carbon nanofibers before being subjected to the oxidation treatment due to an increase in the number of crystal defects on the surface of the carbon nanofibers. The carbon nanofibers are preferably oxidized so that the carbon nanofibers subjected to the oxidation treatment have a Raman peak ratio (D/G) larger than that of the carbon nanofibers before being subjected to the oxidation treatment by 0.02 or more. The carbon nanofibers subjected to the oxidation treatment may have a specific surface area by nitrogen adsorption of 34 to 58 m$^2$/g. The carbon nanofibers subjected to the oxidation treatment have a specific surface area by nitrogen adsorption larger than that of the carbon nanofibers before being subjected to the oxidation treatment since the surface of the carbon nanofibers is roughened due to the oxidation treatment. The carbon nanofibers are preferably oxidized so that the carbon nanofibers subjected to the oxidation treatment have a specific surface area by nitrogen adsorption larger than that of the carbon nanofibers before being subjected to the oxidation treatment by 9 m$^2$/g or more. The average diameter of the carbon nanofibers subjected to the oxidation treatment may be almost equal to that of the carbon nanofibers before being subjected to the oxidation treatment.

FIG. 1 is a perspective view schematically illustrating a process of compressing the carbon nanofibers used for a seal member according to one embodiment of the invention. The carbon nanofibers may be compressed. The carbon nanofibers may be granulated by the compression process. The carbon nanofibers produced by the vapor growth method include carbon nanofibers having a branched portion. The compression process may be performed at a high pressure so that at least the branched portion is cut from the carbon nanofibers. The compression process may be performed using a dry compression granulator 70 (e.g., roll press machine or roller compactor). Specifically, carbon nanofibers 60 (i.e., raw material) are supplied to the space between a plurality of (e.g., two) rolls 72 and 74 that are continuously rotated in the arrow directions in FIG. 1, and compressed by applying a shear force and a compressive force to the carbon nanofibers 60. Aggregates of carbon nanofibers 80 that have been compressed are obtained by supplying the carbon nanofibers 60 produced by the vapor growth method to the dry compression granulator 70, and compressing the carbon nanofibers 60. A roll press machine normally utilizes a flat roll that does not have a pocket formed in the outer circumferential surface, a roll that has a pocket formed in the outer circumferential surface, or the like. In this embodiment, a flat roll may be used to evenly apply a compressive force to the carbon nanofibers. The interval between the rolls is set to 0 mm (i.e., the rolls come in contact with each other). A given compressive force F (e.g., 980 to 2940 N/cm) may be applied between the rolls. It is preferable to apply a compressive force F of 1500 to 2500

N/cm between the rolls. The compressive force F may be set to an appropriate pressure while checking the presence or absence of a branched portion in the aggregates of the carbon nanofibers 80 using an electron microscope or the like. If the compressive force F is 980 N/cm or more, a branched portion can be cut from a carbon nanofiber having a branched portion. The compression process may be performed a plurality of times (e.g., twice) so that the entire carbon nanofibers are homogenized (uniformly compressed). A granulator may generally utilize a binder (e.g., water) in order to bind a powder. The compression process according to this embodiment may utilize a dry granulation process that does not use a binder for binding the carbon nanofibers. Specifically, since use of a binder may make it difficult to disperse the carbon nanofibers in the subsequent step, a binder removal step may be additionally required. After forming the plate-like (flake-like) aggregates of the carbon nanofibers 80 by compressing the carbon nanofibers between the rolls of the dry compression granulator 70, the size of the aggregates of the carbon nanofibers 80 may be adjusted to a desired value by grinding the aggregates of the carbon nanofibers 80 using a grinder or the like. For example, the aggregates of the carbon nanofibers 80 may be ground (crushed) by applying a shear force by rotating a rotary knife of a grinder at a high speed, and only aggregates of the carbon nanofibers 80 having a size equal to or less than an appropriate size may be screened. The aggregates of the carbon nanofibers 80 subjected to only the compression process differ in size to a large extent. However, since the size of the aggregates of the carbon nanofibers 80 can be adjusted to an appropriate value by thus grinding the aggregates of the carbon nanofibers 80, non-uniform distribution of the aggregates of the carbon nanofibers can be prevented when mixing the aggregates of the carbon nanofibers with the matrix material. The branched portion is cut from the carbon nanofibers by the compression process so that the desired bulk density is achieved (i.e., handling during processing is facilitated). For example, the carbon nanofibers can be granulated to plate-like aggregates of carbon nanofibers.

2. Hydrogenated Acrylonitrile-Butadiene Rubber

A hydrogenated acrylonitrile-butadiene rubber may also be referred to as a hydrogenated nitrile rubber or the like. A hydrogenated acrylonitrile-butadiene rubber is hereinafter referred to as "HNBR". The HNBR may be obtained by hydrogenating a double bond of a nitrile rubber (NBR). Since the HNBR exhibits relatively excellent high-temperature properties and excellent abrasion resistance, the HNBR may be used as a material for a seal member of a formation testing apparatus, for example. The HNBR can also be used at a high temperature of less than 175° C., and may be suitably used at a temperature up to 150° C. The HNBR used in this embodiment may have an acrylonitrile content of 30 to 50 mass %, a Mooney viscosity ($ML_{1+4}100°$ C.) center value of 50 to 100, and a hydrogenation rate of 90% or more. If the acrylonitrile content is 30 mass % or more, the HNBR exhibits excellent oil resistance, and rarely shows blistering due to high gas permeation. If the acrylonitrile content is 50 mass % or less, the HNBR exhibits water resistance, and may be used in an aqueous system. If the Mooney viscosity ($ML_{1+4}100°$ C.) center value is 50 or more, the HNBR satisfies basic requirements (e.g., tensile strength (TB) and permanent set (PS)). If the Mooney viscosity ($ML_{1+4}100°$ C.) center value is 100 or less, the HNBR has a moderate viscosity that allows the HNBR to be processed. If the hydrogenation rate is 90% or more, the HNBR exhibits excellent heat resistance.

3. Filler

The filler has an average particle diameter of 5 to 100 nm. The filler may be at least one material selected from carbon black, silica, clay, talc, and the like that may be used as a filler for an elastomer. In this case, carbon black may have an average particle diameter of 10 to 100 nm. Silica, clay, and talc may have an average particle diameter of 5 to 50 nm. The filler according to this embodiment excludes carbon nanofibers.

The matrix area of the HNBR can be divided into small areas by adding the filler to the HNBR. The small matrix areas are reinforced by the carbon nanofibers. Therefore, the amount of carbon nanofibers used can be reduced by adding the filler.

The aspect ratio of the carbon nanofibers is equal to or larger than about ten times the aspect ratio of the filler. The experimental results suggest that the amount of carbon nanofibers used can be reduced by one part by mass by mixing the filler in an amount of 10 parts by mass, for example.

The seal member may include 10 to 100 parts by mass of the carbon nanofibers based on 100 parts by mass of the HNBR. Note that the amount of the carbon nanofibers may be appropriately changed depending on the type of carbon nanofibers or the presence or absence of the filler.

When using the carbon nanofibers having an average diameter of 10 to 20 nm, the seal member may include 10 to 60 parts by mass of the carbon nanofibers and 0 to 100 parts by mass of the filler having an average particle diameter of 5 to 100 nm based on 100 parts by mass of the HNBR. In this case, when the amount (parts by mass) of the filler is referred to as W1, and the amount (parts by mass) of the carbon nanofibers is referred to as W2, the amount of the filler and the amount of the carbon nanofibers in the seal member may satisfy the expression (1): $Wt=0.1W1+W2$ and the expression (2): $20 \leq Wt \leq 60$. Therefore, when the seal member does not include the filler, the seal member may include 20 parts by mass or more of the carbon nanofibers having an average diameter of 10 to 20 nm. When the seal member includes 10 parts by mass of the carbon nanofibers, the seal member may include 100 parts by mass of the filler.

When using the carbon nanofibers having an average diameter of 60 to 110 nm, the seal member may include 14 to 100 parts by mass of the carbon nanofibers and 0 to 60 parts by mass of the filler having an average particle diameter of 5 to 100 nm based on 100 parts by mass of the HNBR. In this case, when the amount (parts by mass) of the filler is referred to as W1, and the amount (parts by mass) of the carbon nanofibers is referred to as W2, the amount of the filler and the amount of the carbon nanofibers in the seal member may satisfy the expression (3): $Wt=0.1W1+W2$ and the expression (4): $20 \leq Wt \leq 100$. Therefore, when the seal member does not include the filler, the seal member may include 20 parts by mass or more of the carbon nanofibers having an average diameter of 60 to 110 nm. When the seal member includes 14 parts by mass of the carbon nanofibers, the seal member may include 60 parts by mass of the filler.

4. Method of Producing Seal Member

A method of producing a seal member according to one embodiment of the invention includes mixing carbon nanofibers into an HNBR, and uniformly dispersing the carbon nanofibers in the HNBR by applying a shear force to obtain a carbon fiber composite material. A seal member is obtained by molding the carbon fiber composite material into a desired shape. In this step, aggregates of carbon nanofibers obtained by the compression process may be used as the carbon nanofibers. This step is described in detail below with reference to FIGS. 2 to 4.

Figure 2:
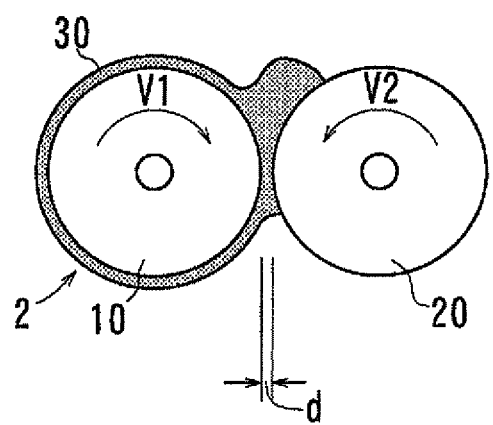
FIG. 2 is a diagram schematically illustrating a method of producing a carbon fiber composite material according to one embodiment of the invention that utilizes an open-roll method.
Figure 3:
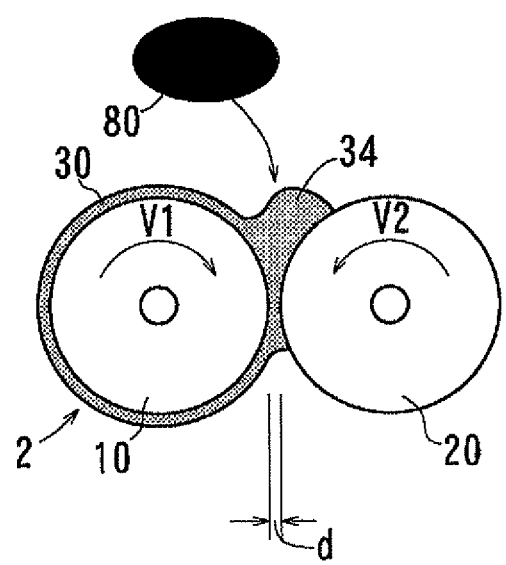
FIG. 3 is a diagram schematically illustrating a method of producing a carbon fiber composite material according to one embodiment of the invention that utilizes an open-roll method.
Figure 4:
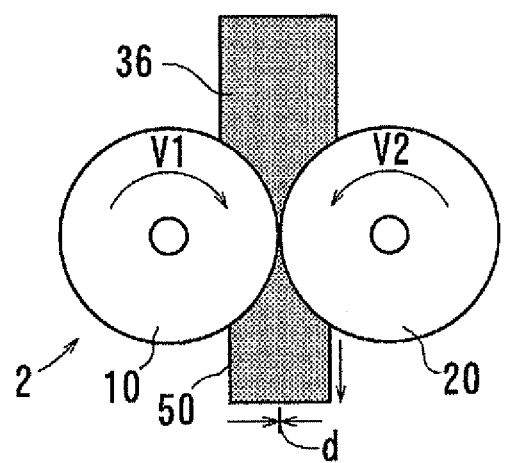
FIG. 4 is a diagram schematically illustrating a method of producing a carbon fiber composite material according to one embodiment of the invention that utilizes an open-roll method.

FIGS. 2 to 4 are diagrams schematically illustrating the method of producing a seal member according to this embodiment that utilizes an open-roll method. The network component of the HNBR (raw material) in uncrosslinked form may have a first spin-spin relaxation time ($T2n$), measured for $^1H$ at 30° C. by the Hahn-echo method using the pulsed NMR technique, of 100 to 3000 μsec. The network component of the HNBR (raw material) in uncrosslinked form may have a first spin-spin relaxation time ($T2n$), measured for $^1H$ at 30° C. by the Hahn-echo method using the pulsed NMR technique, of 100 to 3000 μsec within a temperature range employed during tight milling described below. A commercially available HNBR that is not liquid has a first spin-spin relaxation time ($T2n$) within the above range. Note that it may be impossible to measure the first spin-spin relaxation time ($T2n$) when the carbon nanofibers include a substance that affects a magnetic field.

As illustrated in FIGS. 2 to 4, a first roll 10 and a second roll 20 of a two-roll open roll 2 are disposed at a predetermined distance d (e.g., 0.5 to 1.5 mm). The first roll 10 and the second roll 20 are respectively rotated at rotation speeds V1 and V2 in the directions indicated by arrows in FIGS. 2 to 4 or in the reverse directions. As illustrated in FIG. 3, an HNBR 30 that is wound around the first roll 10 is masticated so that the molecular chains of the HNBR are moderately cut to produce free radicals. The free radicals of the HNBR produced by mastication are easily bonded to carbon nanofibers.

As illustrated in FIG. 3, carbon nanofibers 80 are supplied to a bank 34 of the HNBR 30 wound around the first roll 10 optionally together with a filler (not shown), and the HNBR 30 and the carbon nanofibers 80 are mixed. The HNBR 30 and the carbon nanofibers 80 may be mixed using an internal mixing method, a multi-screw extrusion kneading method, or the like instead of the open-roll method.

As illustrated in FIG. 4, the distance d between the first roll 10 and the second roll 20 is set to 0.5 mm or less, and preferably 0 to 0.5 mm, for example. A mixture 36 is then supplied to the open roll 2, and tight-milled one or more times. The mixture 36 may be tight-milled about one to ten times, for example. When the surface velocity of the first roll 10 is referred to as V1, and the surface velocity of the second roll 20 is referred to as V2, the surface velocity ratio (V1/V2) of the first roll 10 to the second roll 20 during tight milling may be 1.05 to 3.00, and is preferably 1.05 to 1.2. A desired shear force can be applied by utilizing such a surface velocity ratio. A carbon fiber composite material 50 that is extruded through the narrow space between the rolls is deformed to a large extent as a result of the restoring force of the HNBR 30 due to elasticity (see FIG. 4), so that the carbon nanofibers 80 move to a large extent together with the HNBR 30. The carbon fiber composite material 50 obtained by tight milling is rolled (sheeted) by the rolls to have a given thickness. The tight milling step may be performed while setting the roll temperature at a relatively low temperature (e.g., 0 to 50° C., and preferably 5 to 30° C.) in order to obtain as high a shear force as possible. The measured temperature of the HNBR 30 may be adjusted to 0 to 50° C. This causes a high shear force to be applied to the HNBR 30 so that the aggregated carbon nanofibers 80 are removed by the molecules of the HNBR one by one, and become dispersed in the HNBR 30. In particular, since the HNBR 30 has elasticity, viscosity, and chemical interaction with the carbon nanofibers 80, the carbon nanofibers 80 can be easily dispersed in the HNBR 30. The carbon fiber composite material 50 in which the carbon nanofibers 80 exhibit excellent dispersibility and dispersion stability (i.e., the carbon nanofibers rarely re-aggregate) can thus be obtained.

Specifically, when mixing the HNBR and the carbon nanofibers using the open roll, the viscous HNBR enters the space between the carbon nanofibers, and a specific portion of the HNBR is bonded to a highly active site of the carbon nanofiber through chemical interaction. When the carbon nanofibers have a moderately active surface due to the oxidation treatment, the carbon nanofibers are easily bonded to the molecules of the HNBR. When a high shear force is applied to the HNBR, the carbon nanofibers move along with the movement of the molecules of the HNBR. The aggregated carbon nanofibers are separated by the restoring force of the HNBR due to elasticity that occurs after shearing, and become dispersed in the HNBR. According to this embodiment, when the carbon fiber composite material is extruded through the narrow space between the rolls, the carbon fiber composite material is deformed to have a thickness greater than the distance between the rolls as a result of the restoring force of the HNBR due to elasticity. It is considered that this causes the carbon fiber composite material to which a high shear force is applied to flow in a more complicated manner so that the carbon nanofibers are dispersed in the HNBR. The carbon nanofibers dispersed in the HNBR are prevented from re-aggregating due to chemical interaction with the HNBR to exhibit excellent dispersion stability.

The carbon nanofibers may be dispersed in the HNBR by applying a shear force using the internal mixing method or the multi-screw extrusion kneading method instead of the open-roll method. Specifically, it suffices that a shear force sufficient to separate the aggregated carbon nanofibers be applied to the HNBR. It is preferable to use the open-roll method because the actual temperature of the mixture can be measured and managed while managing the roll temperature. A crosslinking agent may be added before or when mixing the HNBR and the carbon nanotubes, or mixed into the carbon fiber composite material that has been tight-milled and sheeted, and the carbon fiber composite material may thus be crosslinked to obtain a crosslinked carbon fiber composite material.

A seal member may be obtained by molding the carbon fiber composite material into a desired shape (e.g., endless shape) using a rubber molding method (e.g., injection molding, transfer molding, press molding, extrusion molding, or calendering). The seal member may be formed of the crosslinked carbon fiber composite material.

In the method of producing a carbon fiber composite material according to this embodiment, a compounding ingredient normally used when processing an HNBR may be added. As the compounding ingredient, a known compounding ingredient may be used. Examples of the compounding ingredient include a crosslinking agent, a vulcanizing agent, a vulcanization accelerator, a vulcanization retarder, a softener, a plasticizer, a curing agent, a reinforcing agent, a filler, an aging preventive, a colorant, and the like. These compounding ingredients may be added to the HNBR at an appropriate timing during the mixing process. A peroxide may be used as the crosslinking agent. The crosslinking agent may be added before mixing the carbon nanofibers into the HNBR, or may be added together with the carbon nanofibers, or may be added after mixing the carbon nanofibers and the HNBR, for example. The crosslinking agent may be added to the uncrosslinked carbon fiber composite material after tight milling in order to prevent scorching, for example.

5. Seal Member

The seal member exhibits excellent high-temperature properties and abrasion resistance as a result of reinforcing the HNBR with the carbon nanofibers. Therefore, the seal member may be used as a static seal member and a dynamic seal member. In particular, the seal member is preferably used as a dynamic seal member. The seal member may have a known shape (e.g., endless shape). For example, the seal member may be an O-ring, an angular seal having a rectangular cross-sectional shape, a D-ring having a cross-sectional shape in the shape of the letter "D", an X-ring having a cross-sectional shape in the shape of the letter "X", an E-ring having a cross-sectional shape in the shape of the letter "E", a V-ring having a cross-sectional shape in the shape of the letter "V", a U-ring having a cross-sectional shape in the shape of the letter "U", an L-ring having a cross-sectional shape in the shape of the letter "L", or the like. The seal member may be used as a stator or a rotor of a fluid-driven motor (e.g., mud motor).

Figure 5:
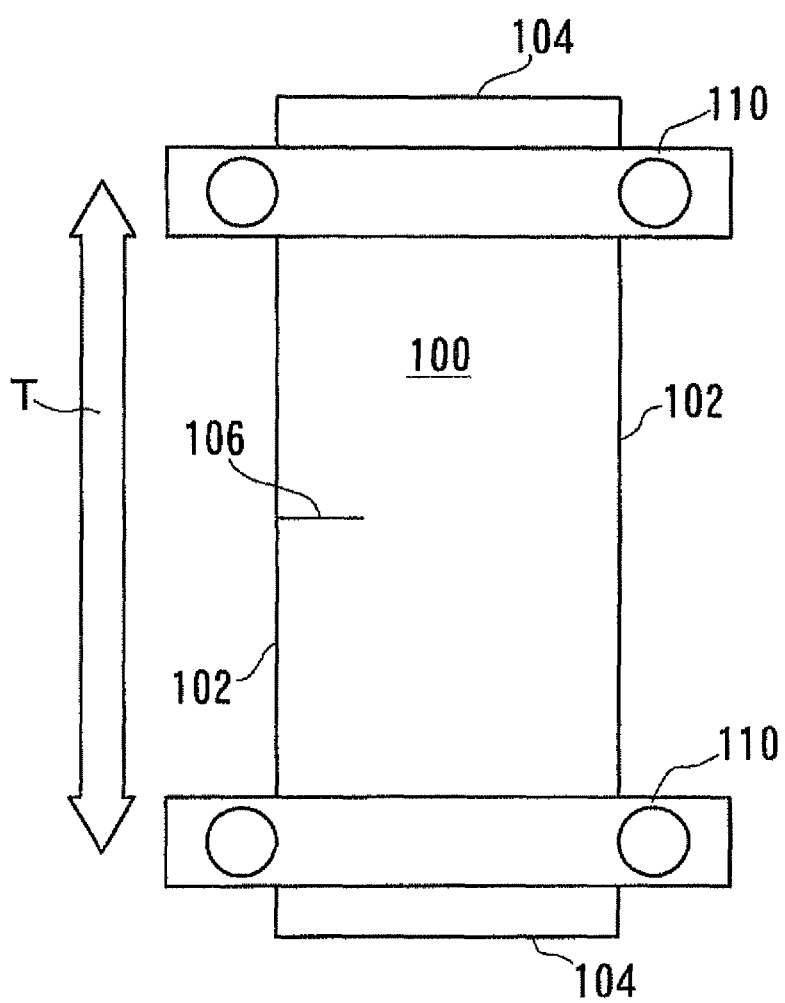
FIG. 5 is a diagram schematically illustrating a tension fatigue test on a seal member according to one embodiment of the invention.

FIG. 5 is a diagram schematically illustrating a tension fatigue test on a seal member according to one embodiment of the invention.

As illustrated in FIG. 5, a strip-shaped specimen 100 (length: 10 mm, width: 4 nm, thickness: 1 mm) is cut from a crosslinked carbon fiber composite material produced as described in the section entitled "4. Method of producing seal member". A cut 106 (depth: 1 mm) is formed from the center of a long side 102 of the specimen 100 along the widthwise direction. Each end of the specimen 100 near a short side 104 is held using a chuck 110, and a tensile load (0 to 4 N/mm) is repeatedly applied to the specimen 100 in the direction indicated by an arrow T (see FIG. 5) in the air at a frequency of 1 Hz. The number of tensile load application operations (number of cycles to fracture) performed until the specimen 100 breaks is measured up to 1,000,000. The cut 106 may be formed in the specimen 100 by cutting the specimen 100 to a depth of 1 mm using a razor blade. Some rubber composition abrasion resistance test methods have been proposed. It is considered that the abrasion resistance of a rubber composition can be evaluated by the above tension fatigue test. A phenomenon in which a rubber composition wears away due to friction is considered to occur when the rubber composition is torn off by the contact surface. Therefore, when the tension fatigue test is performed in a state in which a cut is formed in the specimen, and the specimen does not break even if a large number of tensile load application operations have been performed, it is considered that the seal member exhibits excellent abrasion resistance. The seal member includes a hydrogenated acrylonitrile-butadiene rubber (HNBR) and carbon nanofibers, and has a number of cycles to fracture of 7000 or more when subjected to the tension fatigue test at a temperature of 70° C., a maximum tensile stress of 4 N/mm, and a frequency of 1 Hz. The seal member may have a number of cycles to fracture of 10,000 or more, and preferably more than 1,000,000, when subjected to the tension fatigue test at a temperature of 70° C., a maximum tensile stress of 4 N/mm, and a frequency of 1 Hz.

The seal member may have a ratio (Nb/Na) of a number of cycles to fracture Nb when subjected to the tension fatigue test at a temperature of 150° C., a maximum tensile stress of 2.5 N/mm, and a frequency of 1 Hz to a number of cycles to fracture Na when subjected to the tension fatigue test at a temperature of 150° C., a maximum tensile stress of 2 N/mm, and a frequency of 1 Hz, of 0.7 or more, preferably 0.9 or more, and particularly preferably 1.0. The ratio (Nb/Na) is considered to be an index of abrasion resistance at a high temperature and a high pressure. The seal member is considered to exhibit excellent abrasion resistance at a high pressure when the ratio (Nb/Na) is close to 1.0. The seal member may have a number of cycles to fracture of 10,000 or more, preferably 20,000 or more, and particularly preferably 1,000,000 or more, when subjected to the tension fatigue test at a temperature of 150° C., a maximum tensile stress of 2 N/mm, and a frequency of 1 Hz. The seal member may have a number of cycles to fracture of 10,000 or more, preferably 15,000 or more, and particularly preferably 1,000,000 or more, when subjected to the tension fatigue test at a temperature of 150° C., a maximum tensile stress of 2.5 N/mm, and a frequency of 1 Hz. The seal member is considered to exhibit excellent abrasion resistance at a high temperature of 150° C. when the number of cycles to fracture is large when the seal member is subjected to the tension fatigue test at a temperature of 150° C.

The abrasion resistance of the seal member is considered to be affected by the thickness and the surface wettability of the carbon nanofibers or the presence or absence of the filler. The seal member may include 10 to 60 parts by mass of the carbon nanofibers having an average diameter of 10 to 20 nm and 0 to 100 parts by mass of the filler having an average particle diameter of 5 to 100 nm based on 100 parts by mass of the hydrogenated acrylonitrile-butadiene rubber (HNBR), and the amount of the carbon nanofibers and the amount of the filler may satisfy the following expressions (1) and (2). The amount of the carbon nanofibers having an average diameter of 10 to 20 nm is preferably 20 to 60 parts by mass, and particularly preferably 40 to 60 parts by mass.

$$Wt=0.1W1+W2 \tag{1}$$

$$20 \leq Wt \leq 60 \tag{2}$$

W1: amount (parts by mass) of filler, and
W2: amount (parts by mass) of carbon nanofibers.

The seal member may include 14 to 100 parts by mass of the carbon nanofibers having an average diameter of 60 to 110 nm and 0 to 60 parts by mass of the filler having an average particle diameter of 5 to 100 nm based on 100 parts by mass of the hydrogenated acrylonitrile-butadiene rubber (HNBR), and the amount of the carbon nanofibers and the amount of the filler may satisfy the following expressions (3) and (4). When the carbon nanofibers having an average diameter of 60 to 110 nm have been subjected to the oxidation treatment, the amount of the carbon nanofibers may be 14 to 100 parts by mass, and particularly 54 to 100 parts by mass. When the carbon nanofibers having an average diameter of 60 to 110 nm have been subjected to the low-temperature heat treatment, the amount of the carbon nanofibers may be 54 to 100 parts by mass, and particularly 60 to 100 parts by mass.

$$Wt=0.1W1+W2 \tag{3}$$

$$20 \leq Wt \leq 100 \tag{4}$$

W1: amount (parts by mass) of filler, and
W2: amount (parts by mass) of carbon nanofibers.

Figure 6:
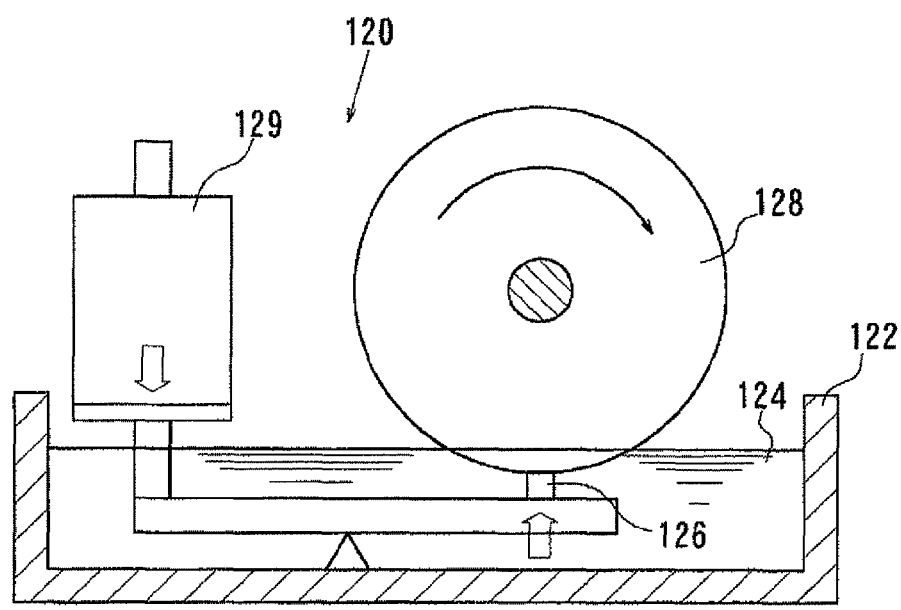
FIG. 6 is a diagram schematically illustrating a high-pressure abrasion test on a seal member according to one embodiment of the invention.

FIG. 6 is a diagram schematically illustrating an abrasion test on a seal member according to one embodiment of the invention.

As illustrated in FIG. 6, a high-pressure abrasion test on the seal member is performed using a DIN abrasion tester 120. A crosslinked carbon fiber composite material sample produced as described in the section entitled "4. Method of producing seal member" is cut into a disk-like specimen 126. The specimen 126 is pressed against and worn by the surface of a rotating disk-like grinding wheel 128 at a given load using a weight 129. The specimen 126 is immersed in water 124 contained in a water tank 122 to suppress an increase in temperature of the specimen 126 due to frictional heat. The disk-like specimen 126 may have a diameter of 8 mm and a thickness of 6 mm. The specimen 126 may be pressed against the disk-like grinding wheel 128 at a load of 49.0 N using the weight 129 (e.g., 5 kgf). The surface of the disk-like grinding wheel 128 may have a roughness of #100. The temperature of the water 124 contained in the water tank 122 may be set to room temperature to 80° C. The specimen 126 may be rubbed against the disk-like grinding wheel 128 over 20 m. The abrasion test is performed in the same manner as the DIN-53516 abrasion test except for the above points. The mass (g) of the specimen is measured before and after the abrasion test.

The seal member may have an abrasion loss Wa of 0.010 to 0.035 $cm^3/N·m$ when subjected to the high-pressure abrasion test at 25° C., and the abrasion loss Wa may satisfy the following expression (5). The seal member preferably has an abrasion loss Wa of 0.015 to 0.035 $cm^3/N·m$, and particularly preferably 0.015 to 0.030 $cm^3/N·m$.

$$Wa=(g_2-g_1)/(P·L·d) \quad (5)$$

$g_1$: mass (g) of specimen before abrasion test,
$g_2$: mass (g) of specimen after abrasion test,
P: load (N) of weight,
L: abrasion distance (m), and
d: specific gravity ($g/cm^3$).

The carbon fiber composite material used to form the seal member includes an HNBR, and carbon nanofibers that are produced by the vapor growth method and are uniformly dispersed in the HNBR.

The carbon fiber composite material in uncrosslinked form may have a first spin-spin relaxation time (T2n), measured for $^1H$ at 150° C. by the Hahn-echo method using the pulsed NMR technique, of 100 to 3000 μsec, and a fraction (fnn) of components having a second spin-spin relaxation time of 0 to 0.2.

The first spin-spin relaxation time (T2n) and the fraction (fnn) of the carbon fiber composite material measured at 150° C. indicate whether or not the carbon nanofibers are uniformly dispersed in the HNBR (matrix). Specifically, when the carbon nanofibers are uniformly dispersed in the HNBR, the HNBR is restrained by the carbon nanofibers. In this state, the mobility of the molecules of the HNBR restrained by the carbon nanofibers is lower than that of the molecules of the HNBR that are not restrained by the carbon nanofibers. Therefore, the first spin-spin relaxation time (T2n), the second spin-spin relaxation time (T2nn), and the spin-lattice relaxation time (T1) of the carbon fiber composite material are shorter than those of the HNBR that does not include the carbon nanofibers. In particular, the first spin-spin relaxation time (T2n), the second spin-spin relaxation time (T2nn), and the spin-lattice relaxation time (T1) further decrease when the carbon nanofibers are uniformly dispersed.

When the molecules of the HNBR are restrained by the carbon nanofibers, the number of non-network components (non-reticulate chain components) is considered to be reduced for the following reasons. Specifically, when the molecular mobility of the entire HNBR has decreased due to the carbon nanofibers, the amount of non-network components that cannot easily move increases so that the non-network components tend to behave in the same manner as the network components. Moreover, since the non-network components (terminal chains) easily move, the non-network components tend to be adsorbed on the active sites of the carbon nanofibers. It is considered that these phenomena decrease the amount of non-network components. Therefore, the fraction (fnn) of components having the second spin-spin relaxation time (T2nn) becomes smaller than that of the HNBR that does not include the carbon nanofibers since fn+fnn=1. Accordingly, when the carbon fiber composite material has values measured by the Hahn-echo method using the pulsed NMR technique within the above ranges, the carbon nanofibers are uniformly dispersed in the carbon fiber composite material.

Moreover, the molecular chains of part of the HNBR are cut during mixing so that free radicals are produced around the carbon nanofibers. The free radicals attack and adhere to the surface of the carbon nanofibers so that an interfacial phase (aggregates of the molecules of the HNBR) is formed. The interfacial phase is considered to be similar to a bound rubber that is formed around carbon black when mixing an elastomer and carbon black, for example. The interfacial phase covers and protects the carbon nanofibers. When adding the carbon nanofibers in an amount equal to or larger than a given value, nanometer-sized cells of the HNBR that are enclosed by the linked interfacial phases are considered to be formed. These small cells are almost homogeneously formed over the entire carbon fiber composite material so that an effect that exceeds an effect achieved when merely combining two materials is expected to be achieved. The size of such a cell structure (average distance between adjacent carbon nanofibers) may be about 45 nm when mixing 60 parts by mass of the carbon nanofibers, for example.

The seal member according to one embodiment of the invention may be used for oilfield applications under severe conditions. This is because the seal member exhibits high mechanical properties at a high temperature of 150° C. or more, maintains high mechanical properties at a relatively low temperature (25° C. or less) and a high pressure (5000 psi or more), and exhibits high abrasion resistance, low friction, high gas resistance against $H_2S$, $CH_4$, or $CO_2$, high chemical resistance, and high thermal conductivity. The oilfield applications are described in detail below.

6. Oilfield Applications

The seal member for oilfield applications may be used for an oilfield apparatus, for example. The seal member may be used as a static seal member or a dynamic seal member of the oilfield apparatus. For example, when using the seal member for a logging tool, a rotating machine (e.g., motor), a reciprocating machine (e.g., piston), or the like, the seal member achieves excellent effects as a dynamic seal member. Typical embodiments of the oilfield apparatus are described below.

The logging tool records physical properties of a formation, a reservoir, and the like inside and around a borehole, geometrical properties (e.g., pore size, orientation, and slope) of a borehole or a casing, the flow behavior of a reservoir, and the like at each depth. For example, the logging tool may be used for subsea applications illustrated in FIG. 7 or underground applications illustrated in FIG. 10. The logging tool is classified as a wireline log/logging tool, a mud logging tool, a logging-while-drilling (LWD) tool, a measurement-while-drilling (MWD) tool (i.e., a measuring instrument is provided in a drilling assembly), and the like. Since these logging tools are used at a deep underground position, the seal member is subjected to a severe environment. It may be necessary for the seal member to endure friction at a high temperature (particularly less than 175° C.) to maintain liquid-tightness.

Figure 7:
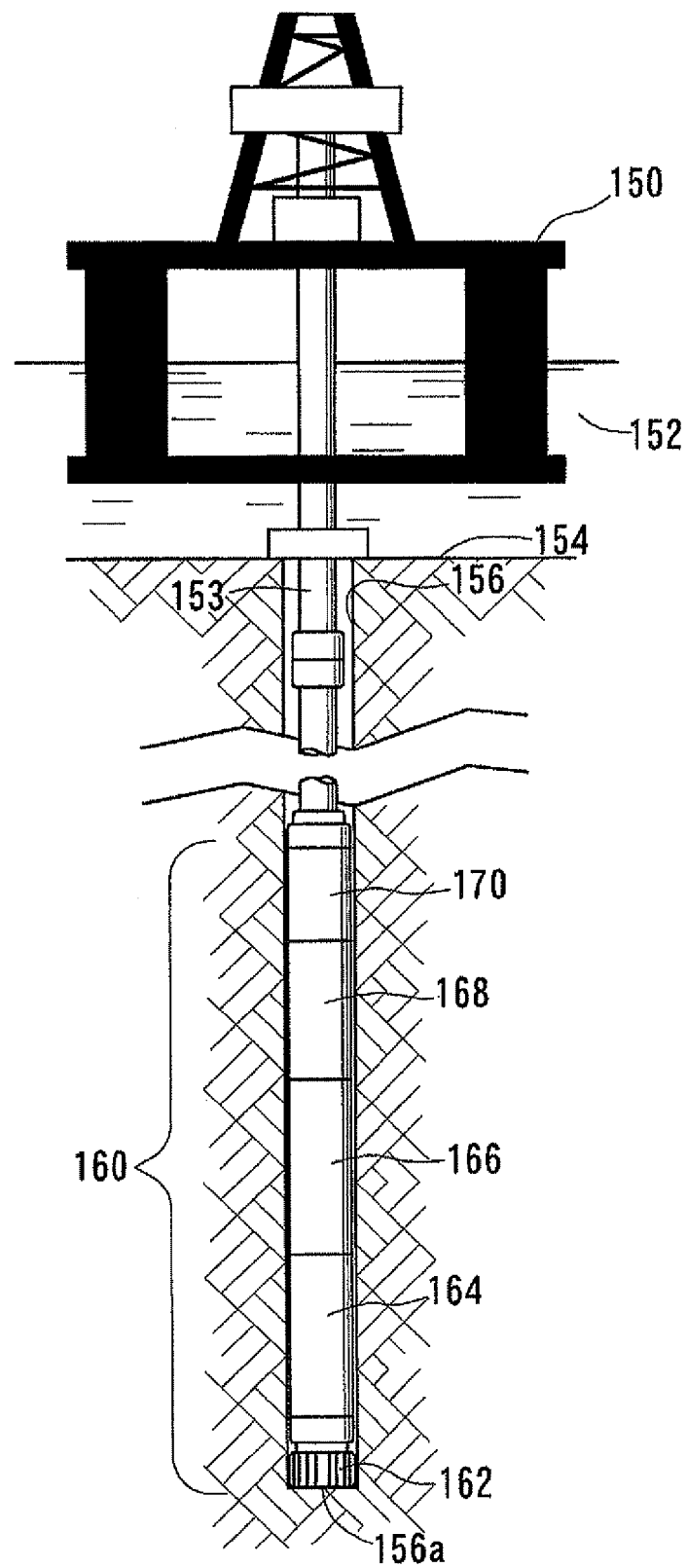
FIG. 7 is a cross-sectional view schematically illustrating a logging tool according to one embodiment of the invention that is used for subsea applications.
Figure 8:
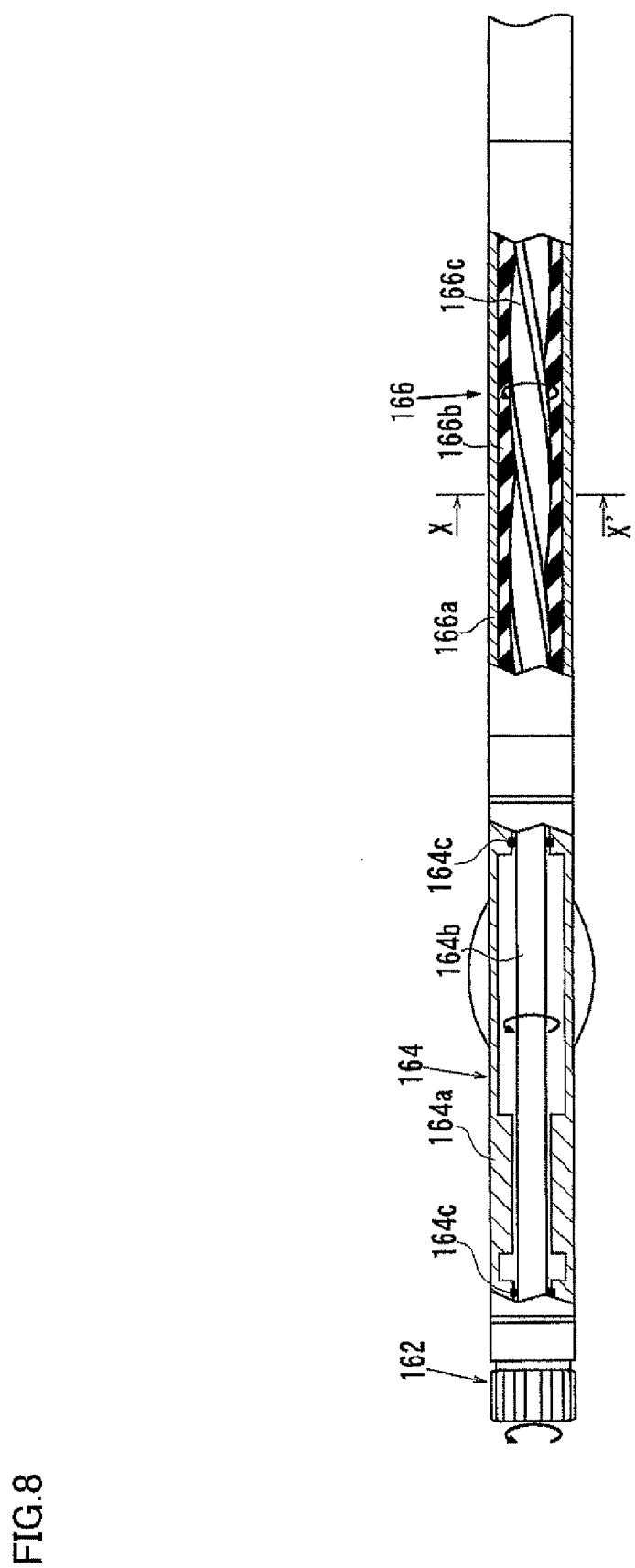
FIG. 8 is a partial cross-sectional view schematically illustrating the logging tool according to one embodiment of the invention illustrated in FIG. 7.
Figure 9:
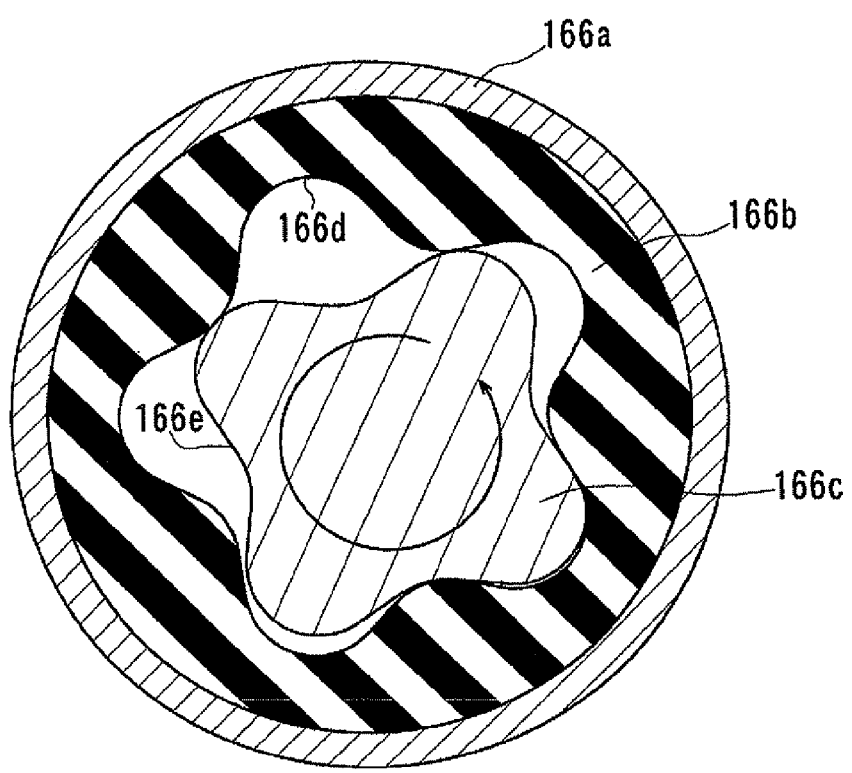
FIG. 9 is a cross-sectional view taken along the line X-X' in FIG. 8 and schematically illustrating a mud motor of the logging tool.
Figure 10:
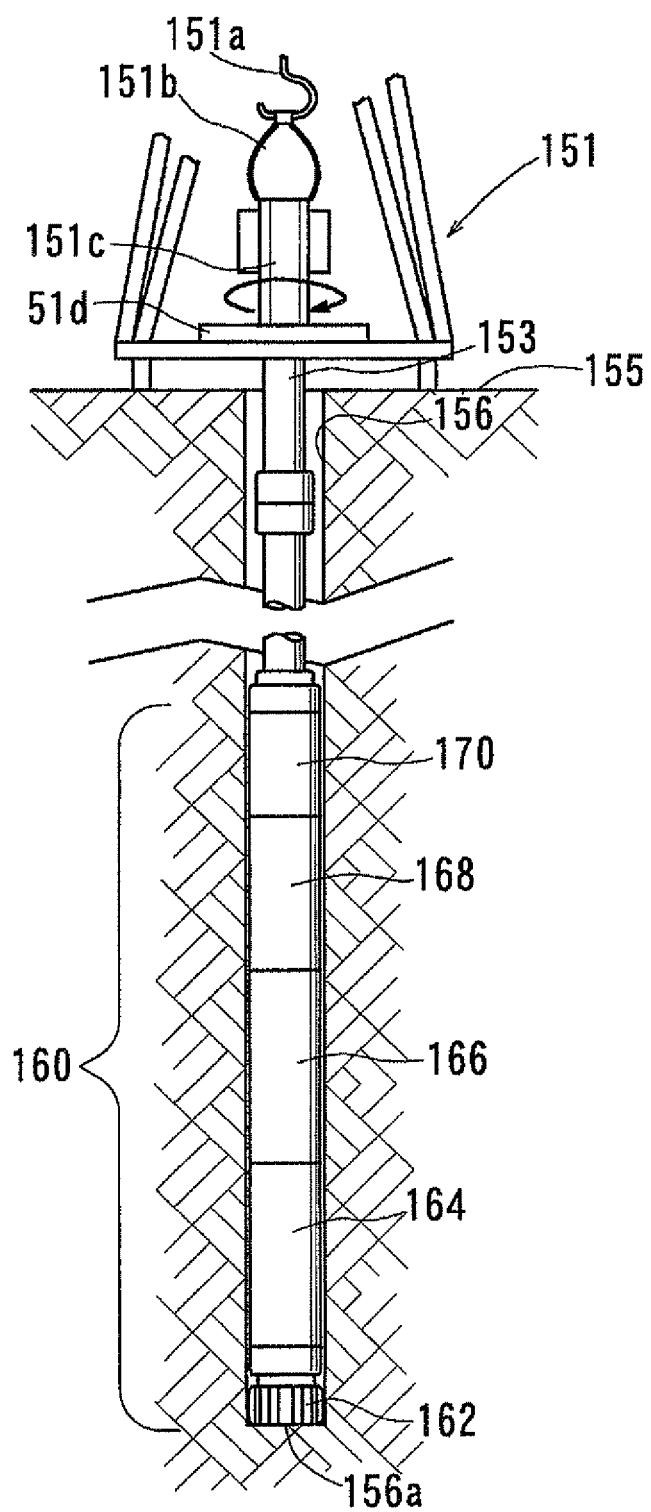
FIG. 10 is a cross-sectional view schematically illustrating a logging tool according to one embodiment of the invention that is used for underground applications.

A seal member according to one embodiment of the invention that is used for the logging tool is described below with reference to FIGS. 7 to 10. FIG. 7 is a cross-sectional view schematically illustrating a logging tool according to one embodiment of the invention that is used for subsea applications. FIG. 8 is a partial cross-sectional view schematically illustrating the logging tool according to one embodiment of the invention illustrated in FIG. 7. FIG. 9 is a cross-sectional view taken along the line X-X' in FIG. 8 and schematically illustrating a mud motor of the logging tool. FIG. 10 is a cross-sectional view schematically illustrating a logging tool according to one embodiment of the invention that is used for underground applications.

As illustrated in FIG. 7, when probing undersea resources using a measuring instrument provided in a drilling assembly, a bottom hole assembly (BHA) 160 (i.e., logging tool) is caused to advance in a borehole 156 (vertical or horizontal passageway) formed in an ocean floor 154 from a platform 150 on the sea 152, and the underground structure and the like are probed to determine the presence or absence of the target substance (e.g., petroleum), for example. The bottom hole assembly 160 is secured on the end of a long drill string 153 that extends from the platform 150, and includes a plurality of modules. For example, the bottom hole assembly 160 may include a drill bit 162, a rotary steerable system (RSS) 164, a mud motor 166, a measurement-while-drilling module 168, and a logging-while-drilling module 170 that are connected in this order from the end of the bottom hole assembly 160. The drill bit 162 is rotated (drills) at a bottom hole 156a of the borehole 156.

The rotary steerable system 164 illustrated in FIG. 8 includes a deviation mechanism (not shown) that causes the drill bit 162 to deviate in a given direction in a state in which the drill bit 162 rotates to enable directional drilling. The seal member according to one embodiment of the invention may be applied to the rotary steerable system 164. The rotary steerable system 164 requires a seal member that exhibits high abrasion resistance at about 210° C. or less, or a seal member that exhibits high chemical resistance against mud, for example. A related-art seal member may not properly function due to wear and tear of the rubber. This problem may be serious in a severe chemical environment. The seal member for a rotary steerable system disclosed in US-A-2006/0157283 is required to function at a high sliding speed (100 mm/sec or less). However, the above problems of the seal member may be exacerbated by reduced properties of the elastomer at the usage temperature and the abrasive nature of the drilling fluid. On the other hand, when using the seal member according to one embodiment of the invention as the seal member of the rotary steerable system 164, the above problems can be solved by high abrasion resistance for sealing drilling mud that contains particles, better chemical resistance against exposure to a wide range of drilling fluids, and better mechanical properties at a high temperature that reduce tearing in addition to the above properties of the seal member. The rotary steerable system 164 includes a cylindrical housing 164a that does not rotate, a transmission shaft 164b that is disposed through the housing 164a and transmits the rotational force of the mud motor 166 to the drill bit 162, and a seal member 164c that rotatably supports the transmission shaft 164b inside the housing 164a. The seal member 164c may be an endless O-ring that is fitted into a circular groove formed in the housing 164a, for example. The seal member 164c seals the space between the housing 164a and the surface of the rotating transmission shaft 164b. When using the seal member produced as described in the section entitled "4. Method of producing seal member" as the seal member 164c, the seal member 164c can maintain the sealing function for a long time since the seal member 164e exhibits excellent abrasion resistance in a severe underground environment at a high temperature (e.g., about 175° C. or less). For example, use of such a seal member is disclosed in US-A-2006/0157283 and U.S. Pat. No. 7,188,685, the entire disclosure of which is incorporated by reference herein. Specifically, FIG. 5 of US-A-2006/0157283 discloses a seal member on a piston that seals on a bore in a bias unit of a rotary steerable assembly. U.S. Pat. No. 7,188,685 discloses a bias unit.

The mud motor 166 illustrated in FIG. 9 is also referred to as a downhole motor. The mud motor 166 is a fluid-driven motor that is driven by the flow of mud and rotates the drill bit 162. Examples of the mud motor 166 include a mud motor for deviated wellbore drilling applications. The seal member according to one embodiment of the invention may be applied to the mud motor 166. The mud motor 166 requires a seal member that exhibits high-temperature properties at about 150 to 200° C., a seal member that can function under extreme abrasive conditions, or a seal member that exhibits chemical resistance to handle a wide range of drilling muds, for example. A related-art seal member for a mud motor may swell, and may show seal failures from cracking and removal of large pieces of the sealing member body (chunking), seal failures from abrasion at a high temperature, and local heating and increased degradation of the seal member from the abrasive action of the seal member, for example. On the other hand, when using the seal member according to one embodiment of the invention as the seal member of the mud motor 166, the above problems can be solved by better mechanical properties at a high temperature to reduce tearing and chunking, better chemical resistance against exposure to a wide range of drilling fluids, a reduction in local heat spots due to better thermal conductivity, and the like, in addition to the above properties of the seal member. The mud motor 166 includes a cylindrical housing 166a, a tubular stator 166 that is secured on the inner circumferential surface of the housing 166a, and a rotor 166c that is rotatably disposed inside a stator 166d. For example, five spiral grooves extend in an inner circumferential surface 166d of the stator 166b from the rotary steerable system 164 to the measurement-while-drilling module 168. The seal member according to one embodiment of the invention that is produced as described in the section entitled "4. Method of producing seal member" may be used as the stator 166b. For example, an outer circumferential surface 166e of the rotor 166c formed of a metal has four threads that protrude spirally. The threads are disposed along the grooves formed in the inner circumferential surface 166d of the stator 166b. As illustrated in FIG. 9, the inner circumferential surface 166d of the stator 166b and the outer circumferential surface 166e of the rotor 166c partially come in contact with each other. A mud passage is formed inside an opening 166f between the inner circumferential surface 166d and the outer circumferential surface 166e. Mud that flows through the opening 166f comes in contact with the outer circumferential surface 166e of the rotor 166c so that the rotor 166c eccentrically rotates inside the stator 166b in the direction indicated by an arrow illustrated in FIGS. 8 and 9, for example. Since the inner circumferential surface 166d of the stator 166b comes in contact with the outer circumferential surface 166e of the rotor 166c and the rotor 166c eccentrically rotates due to mud, the inner circumferential surface 166d of the stator 166b functions in the same manner as a seal member. Since the stator 166b exhibits excellent abrasion resistance in a severe underground environment, the rotor 166c of the mud motor 166 can be rotated for a long time. Although this embodiment has been described above taking the mud motor 166 as an example of the fluid-driven motor, this embodiment may also be applied to another fluid-driven motor that has a similar structure and is driven using a fluid. The rotor may be formed of the seal member that is produced as described in the section entitled "4. Method of producing seal member", and the stator may be formed of a metal, for example. For example, use of such a seal member is disclosed in US-A-2006/0216178 and U.S. Pat. No. 6,604,922, the entire disclosure of which is incorporated by reference herein. Specifically, FIG. 3 of US-A-2006/0216178 discloses an elastomeric stator (lining) (i.e., seal member) that provides a sealing function against a rotor to generate drilling torque on the rotor. Mud flows between the stator and the rotor. FIG. 4 of US-A-2006/0216178 discloses an elastomeric sleeve (i.e., seal member) that is attached to a rotor that provides a sealing function against a stator. FIG. 5 of US-A-2006/0216178 discloses an elastomeric sleeve (i.e., seal member) on a rotor that provides a sealing function against a stator. FIG. 4 of U.S. Pat. No. 6,604,922 discloses that a resilient layer in a liner attached to a stator provides a sealing function. The resilient layer functions as a seal member. FIG. 13 of U.S. Pat. No. 6,604,922 discloses that a rotor lining formed by an elastomer layer provides a sealing function. The elastomer layer functions as a seal member.

The measurement-while-drilling module 168 includes a measurement-while-drilling instrument (not shown) that is disposed inside a chamber 168a provided on a wall of a pipe (drill collar) that has a thick wall. The measurement-while-drilling instrument includes various sensors. For example, the measurement-while-drilling instrument measures bottom hole data (e.g., orientation, slope, bit direction, load, torque, temperature, and pressure), and transmits the measured data to the ground in real time.

The logging-while-drilling module 170 includes a logging-while-drilling instrument (not shown) that is disposed inside a chamber 170a provided on a wall of a pipe (drill collar) that has a thick wall. The measurement-while-drilling instrument includes various sensors. For example, the measurement-while-drilling instrument measures specific resistivity, porosity, acoustic wave velocity, gamma-rays, and the like to obtain physical logging data, and transmits the physical logging data to the ground in real time.

The seal member according to one embodiment of the invention that is produced as described in the section entitled "4. Method of producing seal member" may be used for the measurement-while-drilling module 168 and the logging-while-drilling module 170 inside the chambers 168a and 170a in order to protect the sensors from mud and the like.

As illustrated in FIG. 10, when probing underground resources from ground 155 using a measuring instrument provided in a drilling assembly, a platform and a derrick assembly 151 that are disposed over a borehole 156, and a bottom hole assembly (BHA) 160 (i.e., logging tool) that is disposed in a borehole 156 (vertical or horizontal passageway) formed under the derrick assembly 151 are used, for example. The derrick assembly 151 includes a hook 151a, a rotary swivel 151b, a kelly 151c, and a rotary table 151d. The bottom hole assembly 160 is secured on the end of a long drill string 153 that extends from the derrick assembly 151, for example. Mud is supplied to the drill string 153 from a pump (not shown) through the rotary swivel 151b to drive a fluid-driven motor of the bottom hole assembly 160. The bottom hole assembly 160 is basically the same as that of the logging tool for subsea applications described with reference to FIGS. 8 to 10. Therefore, description thereof is omitted. The seal member according to one embodiment of the invention may also be employed for the logging tool for underground applications. The above embodiment has been described taking an example in which the bottom hole assembly 160 includes the drill bit 162, the rotary steerable system 164, the mud motor 166, the measurement-while-drilling module 168, and the logging-while-drilling module 170. Note that the elements may be appropriately selected and combined depending on the logging application.

The oilfield application is not limited to the logging tool. For example, the seal member according to one embodiment of the invention may be used for a downhole tractor used for wireline log/logging. Examples of the downhole tractor include "MaxTRAC" or "TuffTRAC" (trademark; manufactured by Schlumberger Limited). The downhole tractor requires a reciprocating seal member having high abrasion resistance for longer operational life and reliability at about 175° C. or less.

A related-art seal member requires high polishing on the surface of a sealing piston provided in the downhole tractor. This leads to a high reject rate of the mirror-finished piston and cylinder surfaces during manufacturing. A related-art seal member based on standard elastomers leads to wear, leakage, reduced tool life and failures. A seal member may be subjected to a high sliding speed of up to 2000 ft/hour. A seal member used for the downhole tractor must function with hydraulic oil on both sides, or oil on one side and mud or other well fluids, possibly with particulates, on the other. A tractor job requires a sliding seal member to sufficiently function over a sliding length exceeding the tractoring distance. For example, a 10,000-ft tractoring job requires some of the seal members to reliably function over a cumulative sliding distance of 20,000 ft or less. Moreover, a differential pressure of 200 psi or less is applied across the seal member.

The above problems can be solved by utilizing the seal member according to one embodiment of the invention for the downhole tractor due to the above properties of the seal member. In particular, a relaxed finish on the sealing piston and cylindrical surfaces provides lower manufacturing costs. Moreover, superior wear resistance ensures longer life and a reliable seal function. In addition, lower friction allows longer seal life.

For example, use of such a seal member is disclosed in U.S. Pat. No. 6,179,055, the entire disclosure of which is incorporated by reference herein. Specifically, FIGS. 9A and 10A of U.S. Pat. No. 6,179,055 disclose a seal member on a piston. FIGS. 9B, 10B, and 12 of U.S. Pat. No. 6,179,055 also disclose a seal member on a piston. FIGS. 15, 12, and 16B of U.S. Pat. No. 6,179,055 disclose a seal member on a piston to seal against a tube and a housing. FIG. 16B of U.S. Pat. No. 6,179,055 discloses a seal member on a rod.

The seal member according to one embodiment of the invention may also be applied to a formation testing and reservoir fluid sampling tool, for example. Examples of the formation testing and reservoir fluid sampling tool include "Modular Formation Dynamics Tester (MDT)" (trademark; manufactured by Schlumberger Limited). The formation testing and reservoir fluid sampling tool requires a seal member that exhibits high abrasion resistance in a pumpout module and other pistons. The formation testing and reservoir fluid sampling tool also requires a seal member that exhibits high abrasion resistance and high-temperature properties (210° C. or less) for sealing against the wellbore.

A piston in a displacement unit of a pumpout module sees a large number cycles (reciprocating motion) to move, extract, or pump a reservoir fluid for sampling, tool actuation, and analysis. A piston seal using a related-art seal member tends to wear, and fails after limited service life. This problem occurs to a large extent at a higher temperature. Moreover, particles in the fluid accelerate wear and damage of the seal member.

The above problems can be solved by utilizing the seal member according to one embodiment of the invention for the formation testing and reservoir fluid sampling tool due to the above properties of the seal member. In particular, since the seal member exhibits high abrasion resistance at a higher temperature, seal life can be improved. The seal member that exhibits lower friction ensures less wear and better seal life. The seal member that exhibits better mechanical properties at a high temperature ensures better life and reliability. The seal member that exhibits better chemical resistance may be exposed to various well and produced fluids at a high temperature.

For example, use of such a seal member is disclosed in U.S. Pat. No. 6,058,773 and U.S. Pat. No. 3,653,436, the entire disclosure of which is incorporated by reference herein. Specifically, FIG. 2 of U.S. Pat. No. 6,058,773 discloses a reciprocating seal member on a shuttle piston in a displacement unit (DU) located in a pump-out module. FIGS. 2, 3, and 4 of U.S. Pat. No. 3,653,436 disclose an elastomeric element that seals against a wellbore surface lined with a mudcake.

The seal member according to one embodiment of the invention may also be applied to an in-situ fluid sampling bottle and an in-situ fluid analysis and sampling bottle, for example. Such a bottle may be used for a formation testing/reservoir fluid sampling tool or a wireline log/logging tool, for example. The in-situ fluid sampling bottle and the in-situ fluid analysis and sampling bottle require a seal member that can be used at a high pressure at a low temperature and a high temperature. The in-situ fluid sampling bottle and the in-situ fluid analysis and sampling bottle require a seal member that exhibits high chemical resistance when exposed to a wide range of produced fluids. Moreover, the in-situ fluid sampling bottle and the in-situ fluid analysis and sampling bottle require a seal member that exhibits gas resistance.

When using the in-situ fluid sampling bottle or the in-situ fluid analysis and sampling bottle, a reservoir fluid is captured under in-situ reservoir conditions at a high temperature and a high pressure. When retrieving the bottle to the surface, the temperature drops while the pressure stays high. After retrieval, the sample is moved to other storage, shipping, or analysis containers. The seal member on a sliding piston in the sample bottle holds the following critical function during sample capture and sample export. For example, loss of the sample in situations (e.g., deep water fields) where low-temperature sealing for high pressure is not met when retrieved to the surface, loss of the sample at the surface during retrieval, loss of the sample from seal failures caused by chemical incompatibility with the sample and swelling from gas absorption issues, gas absorption in the seals that leads to swelling and increased friction/drag of the piston, extreme swelling of the seal member that may lead to sticking and seal failures/safety issues while transferring the sample from the bottle to other storage or analysis devices, and problems due to use of multiple sample bottles in a stack during the operation may occur. Loss of the sample at the surface during retrieval may lead to problems especially when the sample contains $H_2S$, $CH_4$, $CO_2$, and the like.

The above problems can be solved by utilizing the seal member according to one embodiment of the invention for the in-situ fluid sampling bottle and the in-situ fluid analysis and sampling bottle due to high gas resistance, high chemical resistance, and good low-temperature sealing performance while satisfying high-temperature/high-pressure properties in addition to the above properties of the seal member.

For example, use of such a seal member is disclosed in U.S. Pat. No. 6,058,773, U.S. Pat. No. 4,860,581, and U.S. Pat. No. 6,467,544 (Brown et al.), the entire disclosure of which is incorporated by reference herein. Specifically, FIG. 7 of U.S. Pat. No. 6,058,773 discloses a seal member on a piston in a sample bottle. FIG. 2 of U.S. Pat. No. 4,860,581 discloses a two-bottle arrangement that includes a seal member on a piston in a sample bottle. FIG. 1 of U.S. Pat. No. 6,467,544 discloses a sealing and shut off valve.

The seal member according to one embodiment of the invention may also be applied to an in-situ fluid analysis tool (IFA), for example. The in-situ fluid analysis tool requires a seal member that exhibits high abrasion and gas resistance for downhole PVT. The term "PVT" means pressure/volume/temperature analysis. The in-situ fluid analysis tool requires a seal member that exhibits high chemical resistance for handling produced fluids. The in-situ fluid analysis tool also requires a flow line static seal member that exhibits high-temperature (about 210° C. or less)/high-pressure properties and high gas resistance. The term "flow line" refers to an area exposed to a sampled fluid.

For example, downhole PVT requires capturing a reservoir fluid sample and reducing the pressure to initiate gas formation and determine the bubble point. Depressurization is fast enough (e.g., greater than 3000 psi/min) so that a seal member that is directly connected to a PVT sample chamber may be subjected to explosive decompression. The seal member must be able to meet 200 or more PVT cycles. The seal member for downhole PVT may fail by gas due to explosive decompression. Therefore, a commercially available seal member does not allow downhole PVT at 210° C. A related-art seal member in a flow line may show integrity issues from swelling and blistering from gas permeation.

The above problems can be solved by utilizing the seal member according to one embodiment of the invention for the in-situ fluid analysis tool. The seal member that exhibits better mechanical properties at high temperature and high pressure can reduce a swelling tendency. The seal member in which voids are reduced by the carbon nanofibers exhibits high gas resistance. The seal member with improved material properties exhibits high resistance to swelling and explosive decompression. The seal member that exhibits high chemical resistance improves chemical resistance against a wide range of produced fluids.

For example, use of such a seal member is disclosed in US-A-2009/0078412, U.S. Pat. No. 6,758,090, U.S. Pat. No. 4,782,695, and U.S. Pat. No. 7,461,547, the entire disclosure of which is incorporated by reference herein. Specifically, FIG. 7 of US-A-2009/0078412 discloses a seal member on a valve, and FIG. 5 of US-A-2009/0078412 discloses a seal member on a piston seal unit. FIG. 21a of U.S. Pat. No. 6,758,090 discloses a seal member on a valve and a piston. U.S. Pat. No. 4,782,695 discloses a seal member between a needle and a PVT chamber. U.S. Pat. No. 7,461,547 discloses a seal member on a valve for isolating a fluid in PVCU as a seal member in a piston-sleeve arrangement in a pressure volume control unit (PVCU) for PVT analysis.

The seal member according to one embodiment of the invention may also be applied to all tools used for wireline log/logging, logging while drilling, well testing, perforation, and sampling operations, for example. Such a tool requires a seal member that enables high-pressure sealing at a low temperature and a high temperature.

Such a tool requires a seal member that works over a wide temperature range from a low temperature to a high temperature when used in deep water. When the seal member does not properly work at a low temperature, leakage into air chambers such as electronic sections and tool failure may occur. A sampling operation in deepwater or cold areas such as the North Sea requires the seal member to function over a wide temperature range from a low temperature to a high temperature. Specifically, the sample is still at a high pressure when the sample is retrieved, while the temperature drops to that of the surface conditions. For example, poor low-temperature sealing at a high pressure may lead to sample leakage, loss, and other problems. Since many of the tools are filled with hydraulic oil and pressurized to 100 to 200 psi, the tools may leak oil under cold surface conditions, or problems may occur during retrieval from the cold deep water section when the seal member does not function well at a low temperature.

The above problems can be solved by utilizing the seal member according to one embodiment of the invention for the above tools due to good low-temperature sealing performance, and better sealing capability at high temperature and high pressure due to better high-temperature mechanical properties in addition to the above properties of the seal member.

The seal member according to one embodiment of the invention may also be applied to a side wall coring tool, for example. The side wall coring tool requires a seal member that exhibits lower friction and high abrasion resistance, a seal member that has long life and high seal reliability, a seal member that exhibits high-temperature (up to about 200° C.) properties, or a seal member that has a value delta P of 100 psi or less (low speed sliding), for example. The term "delta P" refers to a pressure difference across the seal member of the piston. For example, the value delta P decreases (i.e., the piston can be moved with a small pressure difference) when the seal member has low friction.

For example, when the seal member causes sticking or increased frictional force, the side wall coring tool may stop the coring operation. Drilling of each core requires the drill bit to rotate and slide by engaging with the seal member while cutting into the formation. The seal member must have low sealing friction in order to maintain a high core drilling efficiency.

The above problems can be solved by utilizing the seal member according to one embodiment of the invention for the side wall coring tool due to the following properties in addition to the above properties of the seal member. The seal member with low friction can reduce power consumption for the core drilling operation and actuation/movement. The seal member with low friction shows less tendency for sticking and rolling thus improving the efficiency of the core drilling operation. The seal member that exhibits high abrasion resistance can improve seal life in abrasive well fluids.

For example, use of such a seal member is disclosed in US-A-2009/0133932, U.S. Pat. No. 4,714,119, and U.S. Pat. No. 7,191,831, the entire disclosure of which is incorporated by reference herein. Specifically, FIGS. 4 and 5 of US-A-2009/0133932 disclose a seal member on a coring bit in a coring assembly driven by a motor. FIGS. 3B, 7, and 8 of U.S. Pat. No. 4,714,119 disclose a seal member on a drill bit driven by a motor at 2000 rpm or less to advance and cut a core from a borehole. FIGS. 2A and 2B of U.S. Pat. No. 7,191,831 disclose a seal member between a coring bit and a coring assembly driven by a motor. A high efficiency can be achieved by utilizing a low-friction seal member such as the seal member according to this embodiment at the interface between parts 201 to 204 (see FIGS. 3 and 4) or between a bit and a housing illustrated in FIG. 8B.

The seal member according to one embodiment of the invention may also be applied to a telemetry and power generation tool in drilling applications, for example. The telemetry and power generation tool requires a rotating seal member that exhibits high abrasion resistance, a rotating/sliding seal member that exhibits low friction, or a seal member that exhibits high-temperature (up to about 175° C.) properties, for example.

A mud pulse telemetry device such as disclosed in U.S. Pat. No. 7,083,008 depends on a rotary seal member that protects the oil filled tool interior from the external well fluids (drilling mud), for example. However, since particulates are contained in the well fluids, wear and tear of the seal member tend to increase. Seal failure from abrasion and wear of the seal member may lead to mud invasion and tool failure. The telemetry and power tool disclosed in U.S. Pat. No. 7,083,008 works with a sliding seal member on a piston that compensates the internal oil pressure with external fluids, and wear, abrasion, swelling, and sticking of the seal member may lead to failure through external fluid invasion in the tool.

The above problems can be solved by utilizing the seal member according to one embodiment of the invention for the telemetry and power generation tool due to better abrasion resistance and lower friction that allow more reliable operations and longer seal life in addition to the above properties of the seal member.

For example, use of such a seal member is disclosed in U.S. Pat. No. 7,083,008, the entire disclosure of which is incorporated by reference herein. Specifically, FIG. 2 of U.S. Pat. No. 7,083,008 discloses a rotary seal member in a seal/bearing assembly between rotors, and FIG. 3a of U.S. Pat. No. 7,083,008 discloses a sliding seal member on a compensating piston that separates oil and a well fluid in a pressure compensating chamber.

The seal member according to one embodiment of the invention may also be applied to an inflate packer that is used for isolating part of a wellbore for sampling and formation testing, for example. A seal member of the inflate packer must have high abrasion strength and high-temperature properties to allow repeated inflation-deflation operations at multiple wellbore locations.

A related-art packer seal member tends to degrade and fail in sealing function due to the absence of desirable high-temperature properties. A related-art packer seal member may show less than desirable life.

The above problems can be solved by utilizing the seal member according to one embodiment of the invention for the inflate packer due to better abrasion resistance and better high-temperature properties so that the life and the reliability of the packing element can be improved.

For example, use of such a seal member is disclosed in U.S. Pat. No. 7,578,342, U.S. Pat. No. 4,860,581, and U.S. Pat. No. 7,392,851, the entire disclosure of which is incorporated by reference herein. Specifically, FIGS. 1A, 1B, and 1C of U.S. Pat. No. 7,578,342 disclose that a seal member inflates to seal against a borehole, and isolates a section indicated by reference numeral 16. An elastomer sealing element (packing element) illustrated in FIG. 4A of U.S. Pat. No. 7,578,342, or a member indicated by reference numeral 712 or 812 in FIGS. 7 and 8 of U.S. Pat. No. 7,578,342 corresponds to the seal member. FIG. 1 of U.S. Pat. No. 4,860,581 discloses an inflate packing element that seals against a wellbore. U.S. Pat. No. 7,392,851 discloses an inflate packing element.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

Examples of the invention will be described below but the invention is not limited thereto.

7. Examples

7.1 Production of Carbon Nanofibers

Multi-walled carbon nanofibers ("MWCNT-1" in Tables 1 and 2) having an average diameter of 15 nm, a frequency maximum diameter of 18 nm, a rigidity index of 4.8, a Raman peak ratio (D/G) of 1.7, and a specific surface area by nitrogen adsorption of 260 m$^2$/g were produced by the substrate reaction method. The production conditions were as follows. 10.0 g of an aluminum oxide powder was dispersed in a solution prepared by dissolving 0.2 g of ammonium iron citrate and 0.1 g of hexaammonium heptamolybdate tetrahydrate in 300 ml of purified water for 20 minutes by an ultrasonic treatment. The solution was heated at 100° C. with stirring to obtain a catalyst powder. The catalyst powder was placed in an alumina boat, and the alumina boat was placed in a tubular electric furnace. The reaction tube of the electric furnace was a quartz tube having an inner diameter of 3 cm and a length of 1.5 m. The heating area was a center area (600 mm) in the longitudinal direction. The boat containing the catalyst powder was placed at the center of the heating area. After increasing the temperature of the electric furnace to 800° C. in an argon atmosphere, an ethylene/argon mixed gas was circulated through the electric furnace for 30 minutes to obtain carbon nanotubes having an average diameter of 15 nm. The carbon nanofibers were not graphitized. The distance Lx between adjacent defects (i.e., the length of an almost linear portion of the carbon nanofiber) and the diameter D of the carbon nanofiber were measured using a photograph obtained using an electron microscope (SEM) (1.0 kV, magnification: 10,000 to 100,000). The rigidity indices at 200 locations were calculated by Lx/D using the results, and divided by the number of measurement locations (200) to determine the average rigidity index.

Untreated carbon nanofibers having an average diameter of 87 nm were produced by the floating reaction method. The production conditions were as follows. A spray nozzle was installed at the top of a vertical heating furnace (inner diameter: 17.0 cm, length: 150 cm). The inner wall temperature (reaction temperature) of the heating furnace was increased to and maintained at 1000° C. A liquid raw material (i.e., benzene containing 4 wt % of ferrocene) (20 g/min) was supplied from the spray nozzle together with hydrogen gas (100 l/min) so that the raw material was directly sprayed onto the wall of the furnace. The spray nozzle had a conical shape (trumpet shape or umbrella shape). The vertex angle of the nozzle was 60°. Ferrocene was pyrolyzed under the above-mentioned conditions to produce iron particles. The iron particles served as seeds so that carbon nanofibers were produced and grown from carbon produced by pyrolysis of benzene. The carbon nanofibers were continuously produced for one hour while scraping the carbon nanofibers off at intervals of 5 minutes. The untreated carbon nanofibers were heated at 2800° C. in a heating furnace (inert gas atmosphere) to obtain graphitized carbon nanofibers ("MWCNT-5" and "MWCNT-6" in Tables 1 and 2). The graphitized carbon nanofibers "MWCNT-5" indicate multi-walled carbon nanofibers (VGCF-S) manufactured by Showa Denko K.K. having an average diameter of 87 nm, a frequency maximum diameter of 90 nm, a rigidity index of 9.9, an average length of 9.1 μm, a surface oxygen concentration of 2.1 atm %, a Raman peak ratio (D/G) of 0.11, and a specific surface area by nitrogen adsorption of 25 m$^2$/g. The graphitized carbon nanofibers "MWCNT-6" indicate multi-walled carbon nanofibers (VGCF) manufactured by Showa Denko K.K. having an average diameter of 156 nm, a frequency maximum diameter of 160 nm, a rigidity index of 6.8, an average length of 10 μm, a Raman peak ratio (D/G) of 0.18, and a specific surface area by nitrogen adsorption of 15 m$^2$/g.

120 g of the graphitized carbon nanofibers (MWCNT-5) were placed in a container (300×300×150 mm). The container was placed in a heating furnace (700×350×900 mm) into which air was continuously introduced at 50 ml/min. The graphitized carbon nanofibers were heated and oxidized in the heating furnace at 650° C. for two hours to obtain oxidized carbon nanofibers ("MWCNT-2" in Tables 1 and 2). The oxidized carbon nanofibers (MWCNT-2) had an average diameter of 87 nm, a frequency maximum diameter of 90 nm, a rigidity index of 9.9, a surface oxygen concentration of 3.5 atm %, a Raman peak ratio (D/G) of 0.19, and a specific surface area by nitrogen adsorption of 43 m$^2$/g. The mass residual ratio of the mass of the oxidized carbon nanofibers (MWCNT-2) to the mass (100 mass %) of the graphitized carbon nanofibers (MWCNT-5) was 88.9%. The actual temperature inside the heating furnace was ±30° C. with respect to the set temperature.

Separately, the untreated carbon nanofibers having an average diameter of 87 nm were heated in an inert gas atmosphere at 1500° C. that is lower than the reaction temperature employed in the floating reaction method to obtain low-temperature heat-treated carbon nanofibers ("MWCNT-3" in Tables 1 and 2). The low-temperature heat-treated carbon nanofibers (MWCNT-3) had an average diameter of 87 nm, a frequency maximum diameter of 90 inn, a rigidity index of 9.9, a surface oxygen concentration of 2.1 atm %, a Raman peak ratio (D/G) of 1.12, and a specific surface area by nitrogen adsorption of 30 m$^2$/g.

Note that the oxidized carbon nanofibers (MWNT-2) and the low-temperature heat-treated carbon nanofibers (MWNT-3) were granulated by a roll process in order to improve the handling capability in the production process. Specifically, the carbon nanofibers were supplied to a roll press machine (i.e., dry compression granulator having two rolls) (roll diameter: 150 mm, roll: flat roll, roll distance: 0 mm, roll compressive force (linear pressure): 1960 N/cm, gear ratio: 1:1.3, roll rotational speed: 3 rpm), and granulated into plate-shaped aggregates (aggregates of carbon nanofibers) having a diameter of about 2 to 3 cm. The aggregates were ground (crushed) using a crush granulator (rotational speed: 15 rpm, screen: 5 mm) having eight rotary knives to adjust the particle size of the aggregates.

7.2 Production of Carbon Fiber Composite Material Samples of Examples 1 to 10 and Comparative Examples 1 to 9

An HNBR ("HNBR-1" and "HNBR-2" in Tables 1 and 2) was supplied to an open roll (roll temperature: 20° C.), and masticated. After the addition of given amounts of carbon nanofibers and carbon black ("HAF-CB" in Tables 1 and 2) shown in Tables 1 and 2 to the HNBR, the components were mixed, and removed from the open roll. The mixture was wound around the open roll (roll temperature: 10 to 20° C., roll distance: 0.3 mm), and tight-milled five times. The surface velocity ratio of the rolls was set at 1.1. After setting the roll distance to 1.1 mm, the carbon fiber composite material obtained by tight milling was supplied to the open roll, and sheeted. The resulting sheet was compression-molded at 120° C. for two minutes to obtain uncrosslinked carbon fiber composite material samples (thickness: 1 mm) of Examples 1 to 10 and Comparative Examples 2 to 9. Separately, 2 parts by mass of a peroxide ("PO" in Tables 1 and 2) (crosslinking agent) was added to the carbon fiber composite material obtained by tight milling. The mixture was sheeted, and compression-molded at 185° C. for 10 minutes to obtain sheet-shaped crosslinked carbon fiber composite material samples (thickness: 1 mm) of Examples 1 to 10 and Comparative Examples 2 to 6. In Comparative Example 1, the mixing process was performed in the same manner as described above, except that the carbon nanofibers were not used.

In Tables 1 and 2, "HNBR-1" indicates a hydrogenated acrylonitrile-butadiene rubber (manufactured by Zeon Corporation) having a hydrogenation rate of 96% (iodine value: 11), an acrylonitrile content of 36 mass %, and a Mooney viscosity ($ML_{1+4}100°$ C.) center value of 85, and "HNBR-2" indicates a hydrogenated acrylonitrile-butadiene rubber (manufactured by Zeon Corporation) having a hydrogenation rate of 94% (iodine value: 15), an acrylonitrile content of 18 mass %, and a Mooney viscosity ($ML_{1+4}100°$ C.) center value of 80.

In Tables 1 and 2, "HAF-CB" indicates HAP-grade carbon black having an average diameter of 28 nm.

7.3 Measurement Using Pulsed NMR Technique

The uncrosslinked carbon fiber composite material samples of Examples 1 to 10 and Comparative Examples 1 to 9 were subjected to measurement by the Hahn-echo method using the pulsed NMR technique. An instrument "JMN-MU25" (manufactured by JEOL, Ltd.) was used for the measurement. The measurement was conducted under conditions of an observing nucleus of $^1H$, a resonance frequency of 25 MHz, and a 90-degree pulse width of 2 μsec. A decay curve was determined while changing Pi in the pulse sequence (90°x-Pi-180°x) of the Hahn-echo method. The measurement was conducted in a state in which the sample was inserted into a sample tube within an appropriate magnetic field range. The measurement temperature was 150° C. The first spin-spin relaxation time ($T2n/150°$ C.) and the fraction (fnn) of components having the second spin-spin relaxation time of each sample were determined by this measurement. The measurement results are shown in Tables 1 and 2.

7.4 Measurement of Hardness, 50% Modulus, 100% Modulus, Tensile Strength, Elongation at Break, Dynamic Modulus of Elasticity, Tension Set, Tearing Strength, Tearing Energy, Tension Fatigue Life, and DIN Abrasion The rubber hardness (Hs (JIS-A)) of the crosslinked carbon fiber composite material samples of Examples 1 to 10 and Comparative Examples 1 to 9 was measured in accordance with JIS K 6253.

Specimens prepared by cutting the crosslinked carbon fiber composite material samples of Examples 1 to 10 and Comparative Examples 1 to 9 in the shape of a JIS No. 6 dumbbell were subjected to a tensile test in accordance with JIS K 6251 at a temperature of 23±2° C. and a tensile rate of 500 mm/min using a tensile tester (manufactured by Toyo Seiki Seisakusho, Ltd.) to measure the tensile strength ("TB (MPa)" in Tables 1 and 2), elongation at break ("EB (%)" in Tables 1 and 2), 50% modulus ("M50" in Tables 1 and 2), and 100% modulus ("M100" in Tables 1 and 2).

Specimens were prepared by cutting the crosslinked carbon fiber composite material samples of Examples 1 to 10 and Comparative Examples 1 to 9 in the shape of a strip (40×1×5 (width) mm). Each specimen was subjected to a dynamic viscoelasticity test using a dynamic viscoelasticity tester "DMS6100" (manufactured by SIX) at a chuck distance of 20 mm, a measurement temperature of −100 to 300° C., a dynamic strain of ±0.05%, and a frequency of 10 Hz in accordance with JIS K 6394 to measure the dynamic modulus of elasticity ("E' (25° C.) (MPa)" and "E' (200° C.) (MPa)" in Tables 1 and 2) at a measurement temperature of 25° C. and 200° C.

JIS No. 5 specimens were prepared from the crosslinked carbon fiber composite material samples of Examples 1 to 10 and Comparative Examples 1 to 9, and the tension set of each specimen was measured. The tension set (%) was determined by applying a constant load of 1 MPa at 70° C. for 24 hours, and measuring the permanent deformation in accordance with JIS K 6723.

JIS K 6252 angle specimens (uncut) were prepared from the crosslinked carbon fiber composite material samples of Examples 1 to 10 and Comparative Examples 1 to 9. Each specimen was subjected to a tear test in accordance with JIS K 6252 at a tensile rate of 500 mm/min using an instrument "Autograph AG-X" (manufactured by Shimadzu Corporation) to measure the maximum tearing force (N). The measurement result was divided by the thickness (1 mm) of the specimen to determine the tearing strength (N/mm). An area enclosed by the load-displacement curve determined by the tear test (vertical axis: measurement load (N), horizontal axis: stroke displacement (mm) of the tester) was determined to be the tearing energy.

Strip-shaped specimens (10 mm×4 mm (width)×1 mm (thickness)) illustrated in FIG. 5 were prepared from the crosslinked carbon fiber composite material samples of Examples 1 to 10 and Comparative Examples 1 to 9. A cut (depth: 1 mm) was formed in each specimen in the widthwise direction from the center of the long side. Each specimen was subjected to a tension fatigue test using a TMA/SS6100 tester (manufactured by SII) to measure the number of tensile load application operations performed until the specimen broke up to 1,000,000 ("tension fatigue life (number)", "(a) tension fatigue life (number)", and "(b) tension fatigue life (number)" in Tables 1 and 2). In the tension fatigue test indicated by "tension fatigue life (number)" in Tables 1 and 2, a tensile load (0 to 4 N/mm) was repeatedly applied to the specimen in the air at a temperature of 70° C., a maximum tensile stress of 4 N/mm, and a frequency of 1 Hz. In the tension fatigue test indicated by "(a) tension fatigue life (number)" in Tables 1 and 2, a tensile load (0 to 2 N/mm) was repeatedly applied to the specimen in the air at a temperature of 150° C., a maximum tensile stress of 2 N/mm, and a frequency of 1 Hz. In the tension fatigue test indicated by "(b) tension fatigue life (number)" in Tables 1 and 2, a tensile load (0 to 2.5 N/mm) was repeatedly applied to the specimen in the air at a temperature of 150° C., a maximum tensile stress of 2.5 N/mm, and a frequency of 1 Hz. In Tables 1 and 2, "pressure resistance index (b)/(a)" is an index of abrasion resistance at a high pressure, and is calculated by dividing "(b) tension fatigue life" by "(a) tension fatigue life". A case where the specimen did not break when the number of tensile load application operations reached 1,000,000 is indicated by "stopped at 1,000,000" in Tables 1 and 2.

Disk-like specimens (diameter: 8 mm, thickness: 6 mm) were prepared from the crosslinked carbon fiber composite material samples of Examples 1, 2, 4 to 6, 9, and 10 and Comparative Example 2. Each specimen was pressed against a #100 disk-like grinding wheel at a load of 49.0 N using a weight (5 kgf) in water (25° C.) over an abrasion distance of 20 m. The abrasion test was performed in the same manner as the DIN-53516 abrasion test except for the above points. The mass (g) of the specimen was measured before and after the abrasion test. The abrasion loss Wa was calculated by "$(g_2-g_1)/(P \cdot L \cdot d)$" ("DIN abrasion" in Tables 1 and 2). The unit for the abrasion loss Wa is "$cm^3/N \cdot m$". Note that $g_1$ indicates the mass (g) of the specimen before the abrasion test, $g_2$ indicates the mass (g) of the specimen after the abrasion test, P indicates the load (49 N) of the weight, L indicates the abrasion distance (m), and d indicates the specific gravity (g/cm³).

Disk-like specimens (diameter: 8 mm, thickness: 6 mm) were prepared from the crosslinked carbon fiber composite material samples of Examples 1, 2, and 6 and Comparative Example 2. Each specimen was placed in a pressure vessel, pressurized at room temperature and 5.5 MPa for 24 hours using a $CO_2$ fluid, and rapidly depressurized at a depressurization rate of 1.8 MPa/sec in accordance with NACE (National Association of Corrosion Engineers of the United States) TM097-97 to measure a change in volume of the specimen due to the test. The change in volume dV (%) was calculated by "$(Va-Vb) \cdot 100/Vb$". Note that Vb indicates the volume of the specimen before the test, and Va indicates the volume of the specimen after the test. The change in volume dV ("volume expansion (%)" in Tables 1 and 2) indicates the volume expansion after the test, and is used to evaluate the gas resistance. The volume of the specimen before the test was measured using an electronic densimeter. Specifically, the volume Va was calculated by "$(Wa-Ww)/dt$". The volume Vb of the specimen after the test was calculated in the same manner as the volume Va. Note that Wa indicates the weight of the specimen in air before the test, Ww indicates the weight of the specimen in water before the test, and dt indicates the specific gravity of water corrected based on the temperature of water.

The measurement results are shown in Tables 1 and 2.

TABLE 1

|  |  | Example 1 | Example 2 | Example 3 | Example 4 | Example 5 | Example 6 |
|---|---|---|---|---|---|---|---|
| Dynamic seal member | H-NBR-1 (phr) | 100 | 100 | 100 | 100 | 100 | 100 |
|  | H-NBR-2 (phr) | 0 | 0 | 0 | 0 | 0 | 0 |
|  | PO (phr) | 2 | 2 | 2 | 2 | 2 | 2 |
|  | HAF-CB (phr) | 0 | 0 | 0 | 100 | 0 | 0 |
|  | MWCNT-1 (phr) | 20 | 40 | 60 | 10 | 0 | 0 |
|  | MWCNT-2 (phr) | 0 | 0 | 0 | 0 | 20 | 60 |
|  | MWCNT-3 (phr) | 0 | 0 | 0 | 0 | 0 | 0 |
|  | MWCNT-4 (phr) | 0 | 0 | 0 | 0 | 0 | 0 |
|  | MWCNT5 (phr) | 0 | 0 | 0 | 0 | 0 | 0 |
|  | MWCNT-6 (phr) | 0 | 0 | 0 | 0 | 0 | 0 |
| NMR measurement results for uncrosslinked form | T2n/150° C. (μsec) | 1050 | 882 | 757 | 1590 | 1470 | 1370 |
|  | Fnn/150 | 0.16 | 0 | 0 | 0.17 | 0.19 | 0.16 |
| Properties of crosslinked form | Hardness (JIS A) | 84 | 93 | 96 | 97 | 78 | 91 |
|  | M50 (MPa) | 8.2 | 16 | 22 | 24.6 | 8.4 | 21.4 |
|  | M100 (MPa) | 18.5 | 34.5 | 42.9 | 52.5 | 9.5 | 22.4 |
|  | TB (MPa) | 28.9 | 46.9 | 50.7 | 57.8 | 139 | 22.9 |
|  | EB (%) | 200 | 180 | 140 | 110 | 290 | 200 |
|  | E' (25° C.) (MPa) | 81 | 370 | 885 | 256 | 60 | 631 |
|  | E' (200° C.) (MPa) | 26 | 75 | 144 | 64 | 33 | 145 |
|  | Tension set (%) | 0.8 | 0.8 | 0.3 | 0.4 | 2.5 | 2 |
|  | Tearing strength (N/mm) | 99.4 | 108 | 106 | 93.2 | 60 | 108 |
|  | Tearing energy (J) | 3.4 | 2.7 | 2 | 2.9 | 3.3 | 3.1 |
|  | Tension fatigue life (number) | 29000 | stopped at 1,000,000 | stopped at 1,000,000 | 15000 | 10300 | stopped at 1,000,000 |
|  | DIN Abrasion ($cm^3/N \cdot m$) | 0.019 | 0.024 | — | 0.022 | 0.027 | 0.026 |
|  | Volume expansion (%) | 17.8 | 12.1 | — | — | — | 14.7 |
| High-temperature fatigue test | (a) Tension fatigue life (number) | 55000 | stopped at 1,000,000 | — | — | 25000 | stopped at 1,000,000 |
|  | (b) Tension fatigue life (number) | 40000 | stopped at 1,000,000 | — | — | 18000 | stopped at 1,000,000 |
|  | Pressure resistance index (b)/(a) | 0.73 | 1 | — | — | 0.72 | 1 |

|  |  | Example 7 | Example 8 | Example 9 | Example 10 |
|---|---|---|---|---|---|
| Dynamic seal member | H-NBR-1 (phr) | 100 | 100 | 100 | 100 |
|  | H-NBR-2 (phr) | 0 | 0 | 0 | 0 |
|  | PO (phr) | 2 | 2 | 2 | 2 |
|  | HAF-CB (phr) | 0 | 60 | 0 | 0 |
|  | MWCNT-1 (phr) | 0 | 0 | 0 | 0 |
|  | MWCNT-2 (phr) | 100 | 14 | 0 | 0 |
|  | MWCNT-3 (phr) | 0 | 0 | 60 | 100 |
|  | MWCNT-4 (phr) | 0 | 0 | 0 | 0 |
|  | MWCNT5 (phr) | 0 | 0 | 0 | 0 |
|  | MWCNT-6 (phr) | 0 | 0 | 0 | 0 |

TABLE 1-continued

|  |  |  |  |  |  |
|---|---|---|---|---|---|
| NMR measurement results for uncrosslinked form | T2n/150° C. (µsec) | 1270 | 1610 | — | — |
|  | Fnn/150 | 0.1 | 0.19 | — | — |
| Properties of crosslinked form | Hardness (JIS A) | 94 | 90 | 80 | 88 |
|  | M50 (MPa) | 32.3 | 8.9 | 12.2 | 26.5 |
|  | M100 (MPa) | 0 | 11.4 | 21.4 | — |
|  | TB (MPa) | 32.3 | 41.1 | 22.8 | 34.2 |
|  | EB (%) | 50 | 200 | 170 | 90 |
|  | E' (25° C.) (MPa) | 1880 | 95 | 62 | 187 |
|  | E' (200° C.) (MPa) | 314 | 56 | 27 | 51 |
|  | Tension set (%) | 1.7 | 0.9 | 1.7 | 1.5 |
|  | Tearing strength (N/mm) | 103 | 78 | 64 | 64.9 |
|  | Tearing energy (J) | 1.7 | 2.9 | 2.4 | 1.2 |
|  | Tension fatigue life (number) | stopped at 1,000,000 | 13000 | 10200 | 77000 |
|  | DIN Abrasion (cm³/N · m) | — | — | 0.027 | 0.034 |
|  | Volume expansion (%) | — | — | — | — |
| High-temperature fatigue test | (a) Tension fatigue life (number) | — | — | — | stopped at 1,000,000 |
|  | (b) Tension fatigue life (number) | — | — | — | stopped at 1,000,000 |
|  | Pressure resistance index (b)/(a) | — | — | — | 1 |

TABLE 2

|  |  | Comparative Example 1 | Comparative Example 2 | Comparative Example 3 | Comparative Example 4 | Comparative Example 5 |
|---|---|---|---|---|---|---|
| Composition | H-NBR-1 (phr) | 100 | 100 | 100 | 100 | 100 |
|  | H-NBR-2 (phr) | 0 | 0 | 0 | 0 | 0 |
|  | PO (phr) | 2 | 2 | 2 | 2 | 2 |
|  | HAF-CB (phr) | 0 | 100 | 0 | 0 | 0 |
|  | MWCNT-1 (phr) | 0 | 0 | 10 | 0 | 0 |
|  | MWCNT-2 (phr) | 0 | 0 | 0 | 0 | 0 |
|  | MWCNT-3 (phr) | 0 | 0 | 0 | 0 | 0 |
|  | MWCNT-4 (phr) | 0 | 0 | 0 | 20 | 0 |
|  | MWCNT5 (phr) | 0 | 0 | 0 | 0 | 20 |
|  | MWCNT-6 (phr) | 0 | 0 | 0 | 0 | 0 |
| NMR measurement results for uncrosslinked form | T2n/150° C. (µsec) | 2170 | 2010 | 1160 | 790 | 1470 |
|  | Fnn/150 | 0.24 | 0.21 | 0.25 | 0.21 | 0.31 |
| Properties of crosslinked form | Hardness (JIS A) | 52 | 90 | 72 | 78 | 67 |
|  | M50 (MPa) | 0.7 | 9.4 | 3.4 | 4.7 | 3.7 |
|  | M100 (MPa) | 1 | 27.2 | 8.4 | 11.4 | 8.7 |
|  | TB (MPa) | 8.1 | 34.6 | 17 | 23.4 | 14 |
|  | EB (%) | 400 | 130 | 230 | 240 | 270 |
|  | E' (25° C.) (MPa) | 2.8 | 102 | 20 | 42 | 8.4 |
|  | E' (200° C.) (MPa) | 4.3 | 24 | 13 | 18 | 10 |
|  | Tension set (%) | 3.5 | 0.5 | 2.8 | 3.7 | 2.2 |
|  | Tearing strength (N/mm) | 20.9 | 44.7 | 80.9 | 78.8 | 46.1 |
|  | Tearing energy (J) | 2.2 | 0.5 | 4 | 3.7 | 3.2 |
|  | Tension fatigue life (number) | 1 | 700 | 390 | 6100 | 250 |
|  | DIN Abrasion (cm³/N · m) | — | 0.042 | — | — | — |
|  | Volume expansion (%) | — | 44.2 | — | — | — |
| High-temperature fatigue test | (a) Tension fatigue life (number) | — | 1100 | — | — | — |
|  | (b) Tension fatigue life (number) | — | 170 | — | — | — |
|  | Pressure resistance index (b)/(a) | — | 0.15 | — | — | — |

|  |  | Comparative Example 6 | Comparative Example 7 | Comparative Example 8 | Comparative Example 9 |
|---|---|---|---|---|---|
| Composition | H-NBR-1 (phr) | 0 | 100 | 100 | 0 |

TABLE 2-continued

|  |  |  |  |  |  |
|---|---|---|---|---|---|
|  | H-NBR-2 (phr) | 100 | 0 | 0 | 100 |
|  | PO (phr) | 2 | 2 | 2 | 2 |
|  | HAF-CB (phr) | 0 | 0 | 0 | 0 |
|  | MWCNT-1 (phr) | 20 | 0 | 0 | 0 |
|  | MWCNT-2 (phr) | 0 | 10 | 0 | 20 |
|  | MWCNT-3 (phr) | 0 | 0 | 0 | 0 |
|  | MWCNT-4 (phr) | 0 | 0 | 0 | 0 |
|  | MWCNT5 (phr) | 0 | 0 | 0 | 0 |
|  | MWCNT-6 (phr) | 0 | 0 | 10 | 0 |
| NMR measurement results for uncrosslinked form | T2n/150° C. (μsec) | 1580 | 1880 | 2020 | 2010 |
|  | Fnn/150 | 0.28 | 0.22 | 0.23 | 0.25 |
| Properties of crosslinked form | Hardness (JIS A) | 82 | 70 | 65 | 71 |
|  | M50 (MPa) | 3.7 | 4.1 | 4.7 | 4.9 |
|  | M100 (MPa) | 7.2 | 5.6 | 6.7 | 6.9 |
|  | TB (MPa) | 21.6 | 12 | 9.8 | 12.1 |
|  | EB (%) | 300 | 350 | 330 | 320 |
|  | E' (25° C.) (MPa) | 71 | 20 | 38 | 48 |
|  | E' (200° C.) (MPa) | 17 | 13 | 17 | 26 |
|  | Tension set (%) | 4.5 | 3.8 | 4.1 | 3.3 |
|  | Tearing strength (N/mm) | 38 | 52 | 47 | 31 |
|  | Tearing energy (J) | 2.2 | 2.2 | 2.8 | 1.9 |
|  | Tension fatigue life (number) | 110 | 5000 | 1500 | 80 |
|  | DIN Abrasion (cm³/N·m) | — | — | — | — |
|  | Volume expansion (%) | — | — | — | — |
| High-temperature fatigue test | (a) Tension fatigue life (number) | — | — | — | — |
|  | (b) Tension fatigue life (number) | — | — | — | — |
|  | Pressure resistance index (b)/(a) | — | — | — | — |

As is clear from the results shown in Tables 1 and 2, the crosslinked carbon fiber composite material samples of Examples 1 to 10 according to the invention had long tension fatigue life and excellent abrasion resistance as compared with the carbon fiber composite material samples of Comparative Examples 1 to 9. The crosslinked carbon fiber composite material samples of Examples 1, 2, 4 to 6, 9, and 10 according to the invention showed a small DIN abrasion loss (i.e., excellent abrasion resistance) as compared with the carbon fiber composite material sample of Comparative Example 2. The crosslinked carbon fiber composite material samples of Examples 1, 2, 5, 6, and 10 according to the invention exhibited excellent abrasion resistance at a high temperature (150° C.) as compared with the carbon fiber composite material sample of Comparative Example 2. The crosslinked carbon fiber composite material samples of Examples 1, 2, and 6 according to the invention showed small volume expansion (i.e., excellent gas resistance) as compared with the carbon fiber composite material sample of Comparative Example 2.

What is claimed is:

1. A carbon fiber composite material seal member comprising a hydrogenated acrylonitrile-butadiene rubber (HNBR) and carbon nanofibers, wherein
the seal member has a number of cycles to fracture of 7000 or more when subjected to a tension fatigue test at a temperature of 70° C., a maximum tensile stress of 4 N/mm, and a frequency of 1 Hz,
the seal member includes 10 to 60 parts by mass of the carbon nanofibers and 0 to 100 parts by mass of a filler having an average particle diameter of 5 to 100 nm based on 100 parts by mass of the hydrogenated acrylonitrile-butadiene rubber (HNBR),
the amount of the carbon nanofibers and the amount of the filler satisfy the following expressions (1) and (2), $$Wt = 0.1 W1 + W2 \tag{1}$$

$$20 \leq Wt \leq 60 \tag{2}$$

W1: amount (parts by mass) of filler, and
W2: amount (parts by mass) of carbon nanofibers,
the carbon nanofibers have an average diameter of 10 to 20 nm,
the carbon nanofibers have an average rigidity of 3 to 12 before the carbon nanofibers are mixed into the hydrogenated acrylonitrile-butadiene rubber (HNBR), the rigidity being defined by Lx÷D (Lx: distance between adjacent defects of carbon nanofiber, D: diameter of carbon nanofiber), and
the carbon fiber composite material in an uncrosslinked form has a fraction (fnn) of components having a second spin-spin relaxation time of 0 to 0.2 measured for $^1$H at 150° C. by the Hahn-echo method using the pulsed NMR technique.

2. The seal member according to claim 1, the seal member having a number of cycles to fracture of 10,000 or more when subjected to a tensile fatigue test at a temperature of 70° C., a maximum tensile stress of 4 N/mm, and a frequency of 1 Hz.

3. The seal member according to claim 1, the seal member having an abrasion loss Wa of 0.010 to 0.035 cm³/N·m when subjected to a high-pressure abrasion test at 25° C., the abrasion loss Wa satisfying the following expression (5), $$Wa = (g_2 - g_1)/(P \cdot L \cdot d) \tag{5}$$

$g_1$: mass (g) of specimen before abrasion test,
$g_2$: mass (g) of specimen after abrasion test, P: load (N) of weight,
L: abrasion distance (m), and
d: specific gravity (g/cm$^3$).

4. A carbon fiber composite material seal member comprising a hydrogenated acrylonitrile-butadiene rubber (HNBR) and carbon nanofibers, wherein the seal member has a number of cycles to fracture of 7000 or more when subjected to a tension fatigue test at a temperature of 70° C., a maximum tensile stress of 4 N/mm, and a frequency of 1 Hz, the seal member includes 14 to 100 parts by mass of the carbon nanofibers and 0 to 60 parts by mass of a filler having an average particle diameter of 5 to 100 nm based on 100 parts by mass of the hydrogenated acrylonitrile-butadiene rubber (HNBR), the amount of the carbon nanofibers and the amount of the filler satisfy the following expressions (3) and (4), $$Wt=0.1W1+W2 \quad (3)$$

$$20 \leq Wt \leq 100 \quad (4)$$

W1: amount (parts by mass) of filler, and
W2: amount (parts by mass) of carbon nanofibers, the carbon nanofibers have an average diameter of 60 to 110 nm, the carbon nanofibers have an average rigidity of 3 to 12 before the carbon nanofibers are mixed into the hydrogenated acrylonitrile-butadiene rubber (HNBR), the rigidity being defined by Lx÷D (Lx: distance between adjacent defects of carbon nanofiber, D: diameter of carbon nanofiber), and the carbon fiber composite material in an uncrosslinked form has a fraction (fnn) of components having a second spin-spin relaxation time of 0 to 0.2 measured for $^1$H at 150° C. by the Hahn-echo method using the pulsed NMR technique.

5. The seal member according to claim 4, wherein the carbon nanofibers are carbon nanofibers subjected to a low-temperature heat treatment, and the amount of the carbon nanofibers is 54 to 100 parts by mass.

6. The seal member according to claim 1, the seal member being used for an oilfield apparatus.

7. The seal member according to claim 6, wherein the oilfield apparatus is a logging tool that performs a logging operation in a borehole.

8. The seal member according to claim 6, the seal member being an endless seal member that is disposed in the oilfield apparatus.

9. The seal member according to claim 6, the seal member being a stator of a fluid-driven motor that is disposed in the oilfield apparatus.

10. The seal member according to claim 9, wherein the fluid-driven motor is a mud motor.

11. The seal member according to claim 6, the seal member being a rotor of a fluid-driven motor that is disposed in the oilfield apparatus.

12. The seal member according to claim 11, wherein the fluid-driven motor is a mud motor.

13. The seal member according to claim 1, wherein the hydrogenated acrylonitrile-butadiene rubber (HNBR) has an acrylonitrile content of 30 to 50 mass %, a Mooney viscosity ($ML_{1+4}$100° C.) center value of 50 to 100, and a hydrogenation rate of 90% or more.

14. The seal member according to claim 1, wherein the filler is carbon black having an average particle diameter of 10 to 100 nm.

15. The seal member according to claim 4, wherein the filler is carbon black having an average particle diameter of 10 to 100 nm.

16. The seal member according to claim 1, wherein the filler is at least one material selected from silica, talc, and clay, and has an average particle diameter of 5 to 50 nm.

17. The seal member according to claim 4, wherein the filler is at least one material selected from silica, talc, and clay, and has an average particle diameter of 5 to 50 nm.

18. The seal member according to claim 1, the seal member having a ratio (Nb/Na) of a number of cycles to fracture Nb when subjected to a tension fatigue test at a temperature of 150° C., a maximum tensile stress of 2.5 N/mm, and a frequency of 1 Hz to a number of cycles to fracture Na when subjected to a tension fatigue test at a temperature of 150° C., a maximum tensile stress of 2 N/mm, and a frequency of 1 Hz, of 0.7 or more.

19. The seal member according to claim 4, wherein the carbon nanofibers are carbon nanofibers subjected to an oxidation treatment.

20. The seal member according to claim 5, wherein a temperature of the low-temperature heat treatment is higher than a reaction temperature employed in a vapor growth method used for producing the carbon nanofibers.

* * * * *